US009766888B2

(12) United States Patent
Gueron et al.

(10) Patent No.: US 9,766,888 B2
(45) Date of Patent: Sep. 19, 2017

(54) PROCESSOR INSTRUCTION TO STORE INDEXES OF SOURCE DATA ELEMENTS IN POSITIONS REPRESENTING A SORTED ORDER OF THE SOURCE DATA ELEMENTS

(71) Applicant: Intel Corporation, Santa Clara, CA (US)

(72) Inventors: Shay Gueron, Haifa (IL); Vlad Krasnov, Nesher (IL)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 14/229,811

(22) Filed: Mar. 28, 2014

(65) Prior Publication Data

US 2015/0277912 A1 Oct. 1, 2015

(51) Int. Cl.
*G06F 9/30* (2006.01)
*G06F 9/315* (2006.01)
(Continued)

(52) U.S. Cl.
CPC ............ *G06F 9/30036* (2013.01); *G06F 7/24* (2013.01); *G06F 7/36* (2013.01); *G06F 9/30021* (2013.01);
(Continued)

(58) Field of Classification Search
CPC .... G06F 9/30021; G06F 9/30036; G06F 7/24; G06F 7/36; G06F 9/30032
See application file for complete search history.

(56) References Cited

U.S. PATENT DOCUMENTS 5,907,842 A 5/1999 Mennemeier et al.
6,036,350 A 3/2000 Mennemeier et al.
(Continued)

FOREIGN PATENT DOCUMENTS

JP 61-139881 A 6/1986
KR 1020110101647 A 9/2011
(Continued)

OTHER PUBLICATIONS

Combined Search and Examination Report received for United Kingdom Patent Application No. 1500857.6, mailed on Jul. 7, 2015, 7 pages.
(Continued)

*Primary Examiner* — David J Huisman
(74) *Attorney, Agent, or Firm* — Vecchia Patent Agent, LLC

(57) ABSTRACT

A processor of an aspect includes packed data registers, and a decode unit to decode an instruction. The instruction may indicate a first source packed data to include at least four data elements, indicate a second source packed data to include at least four data elements, and indicate a destination storage location. An execution unit is coupled with the packed data registers and the decode unit. The execution unit, in response to the instruction, is to store a result packed data in the destination storage location. The result packed data may include at least four indexes that may identify corresponding data element positions in the first and second source packed data. The indexes may be stored in positions in the result packed data that are to represent a sorted order of corresponding data elements in the first and second source packed data.

12 Claims, 27 Drawing Sheets

(51) Int. Cl.
*G06F 7/24* (2006.01)
*G06F 7/36* (2006.01)

(52) U.S. Cl.
CPC ...... *G06F 9/30032* (2013.01); *G06F 9/30098* (2013.01); *G06F 9/30145* (2013.01)

(56) References Cited

U.S. PATENT DOCUMENTS

| | | | |
|---|---|---|---|
| 6,041,404 | A | 3/2000 | Roussel et al. |
| 6,128,614 | A | 10/2000 | Mennemeier et al. |
| 7,155,601 | B2 | 12/2006 | Chennupaty et al. |
| 8,261,043 | B2 * | 9/2012 | Inoue .................. G06F 9/30021 712/22 |
| 2006/0184765 | A1 | 8/2006 | Krueger |
| 2008/0077768 | A1 * | 3/2008 | Inoue .................. G06F 9/30021 712/9 |
| 2008/0104374 | A1 | 5/2008 | Mohamed |
| 2009/0063485 | A1 | 3/2009 | Schneider |
| 2013/0097187 | A1 | 4/2013 | Ingle et al. |

FOREIGN PATENT DOCUMENTS

| | | |
|---|---|---|
| TW | 538601 B | 6/2003 |
| TW | 201220046 A1 | 5/2012 |
| TW | 201337752 A | 9/2013 |
| WO | 2011/067014 A1 | 6/2011 |

OTHER PUBLICATIONS

Office Action received for Japanese Patent Application No. 2015-005737, mailed on Apr. 12, 2016, 20 pages of English Translation and 17 pages of Japanese Office Action.

Office Action received for Korean Patent Application No. 10-2015-0028036, mailed on Dec. 11, 2015, 5 pages of English Translation and 5 pages of Korean Office Action.

Office Action received for United Kingdom Patent Application No. 1500857.6, mailed on Sep. 15, 2016, 5 pages.

Office Action and Search Report received for Taiwan Patent Application No. 104105067, mailed on Oct. 19, 2016, 12 pages of Taiwan Office Action including 7 pages of English Translation.

Office Action received for Japanese Patent Application No. 2015-005737, mailed on Feb. 14, 2017, 5 pages of Japanese Office Action including 2 pages of English Translation.

* cited by examiner

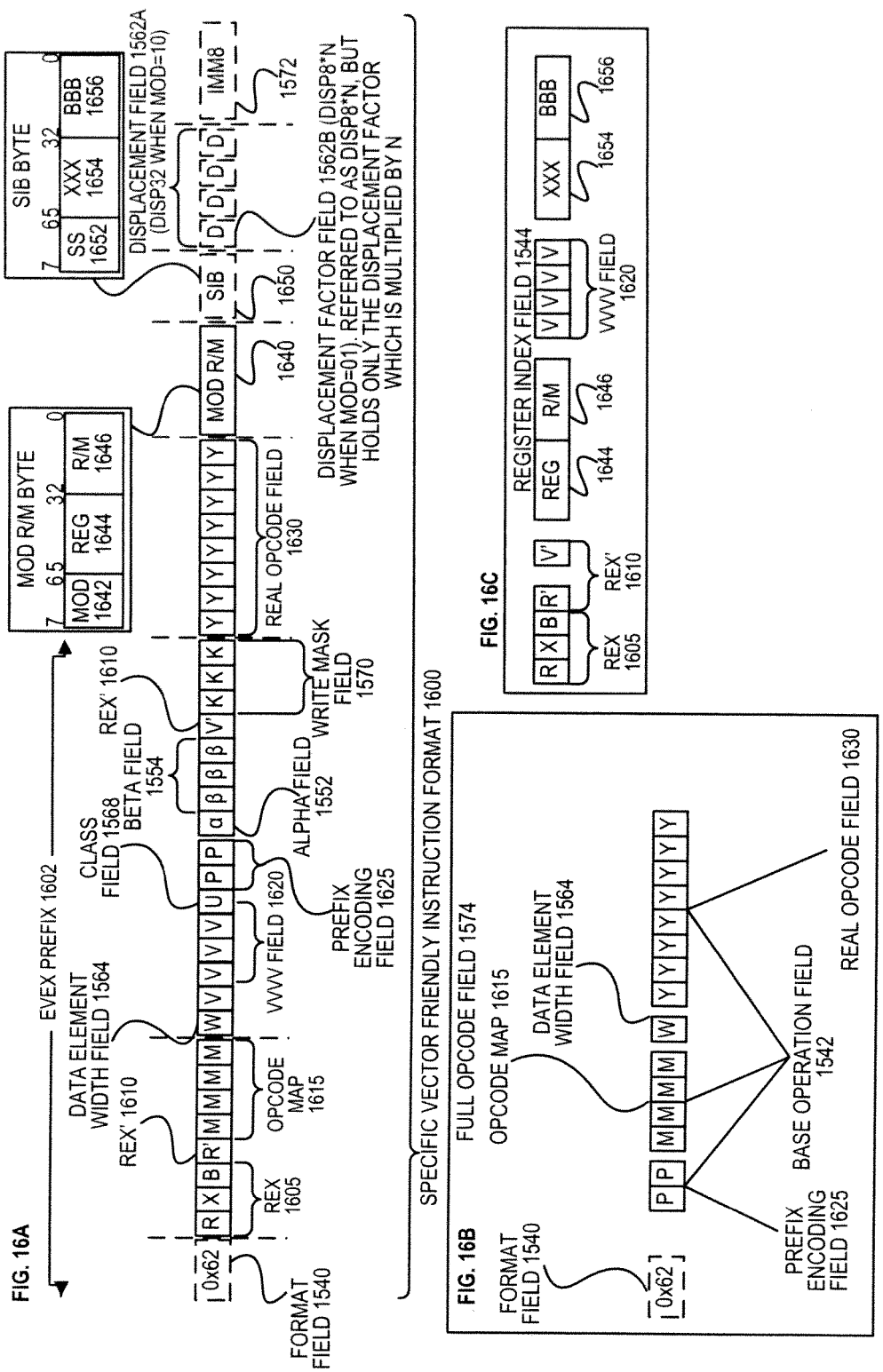

FIG. 17
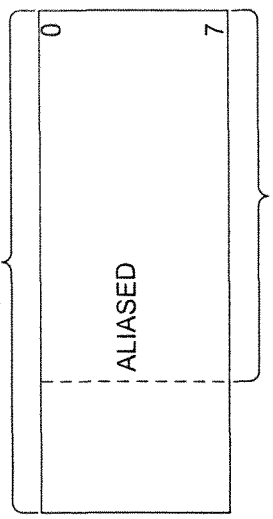
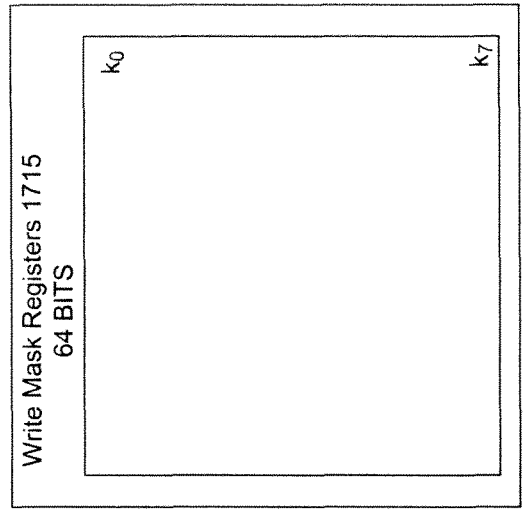
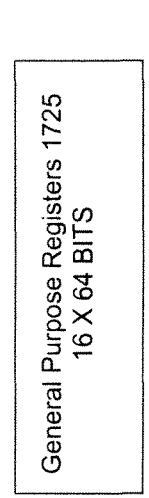
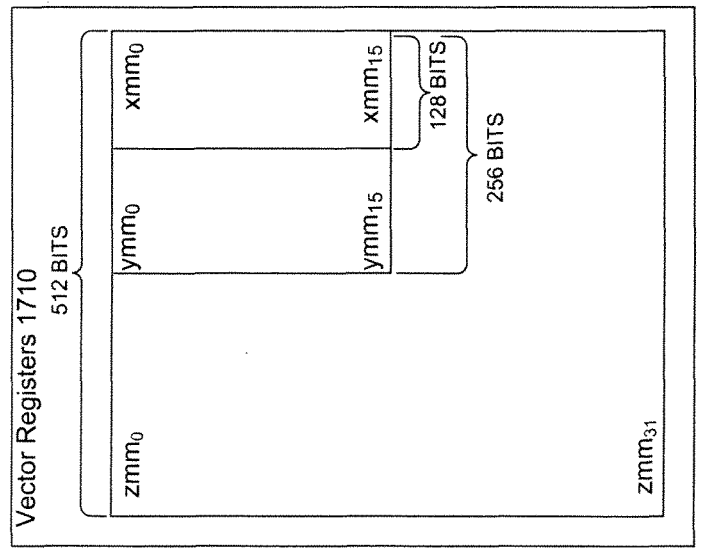

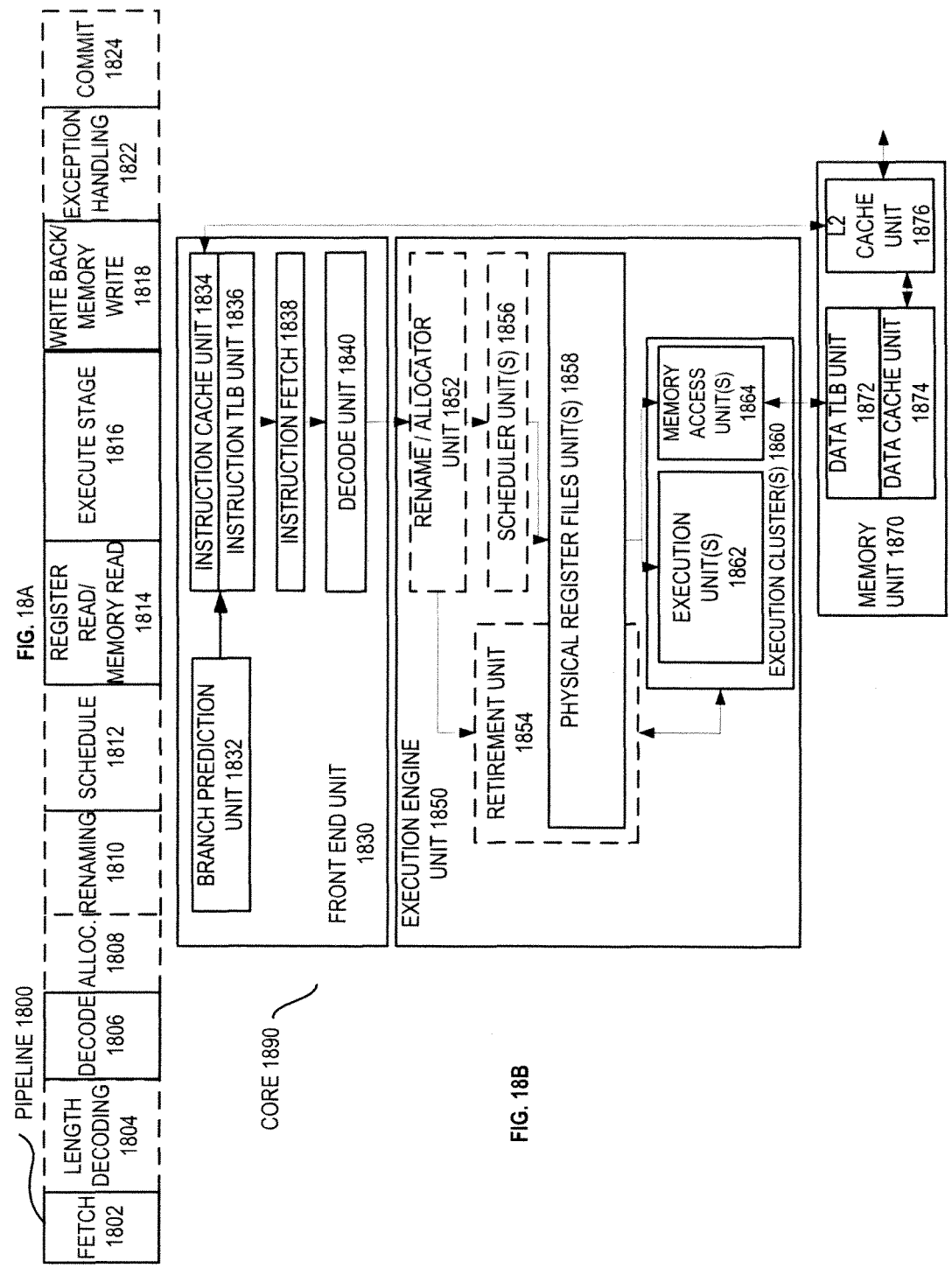

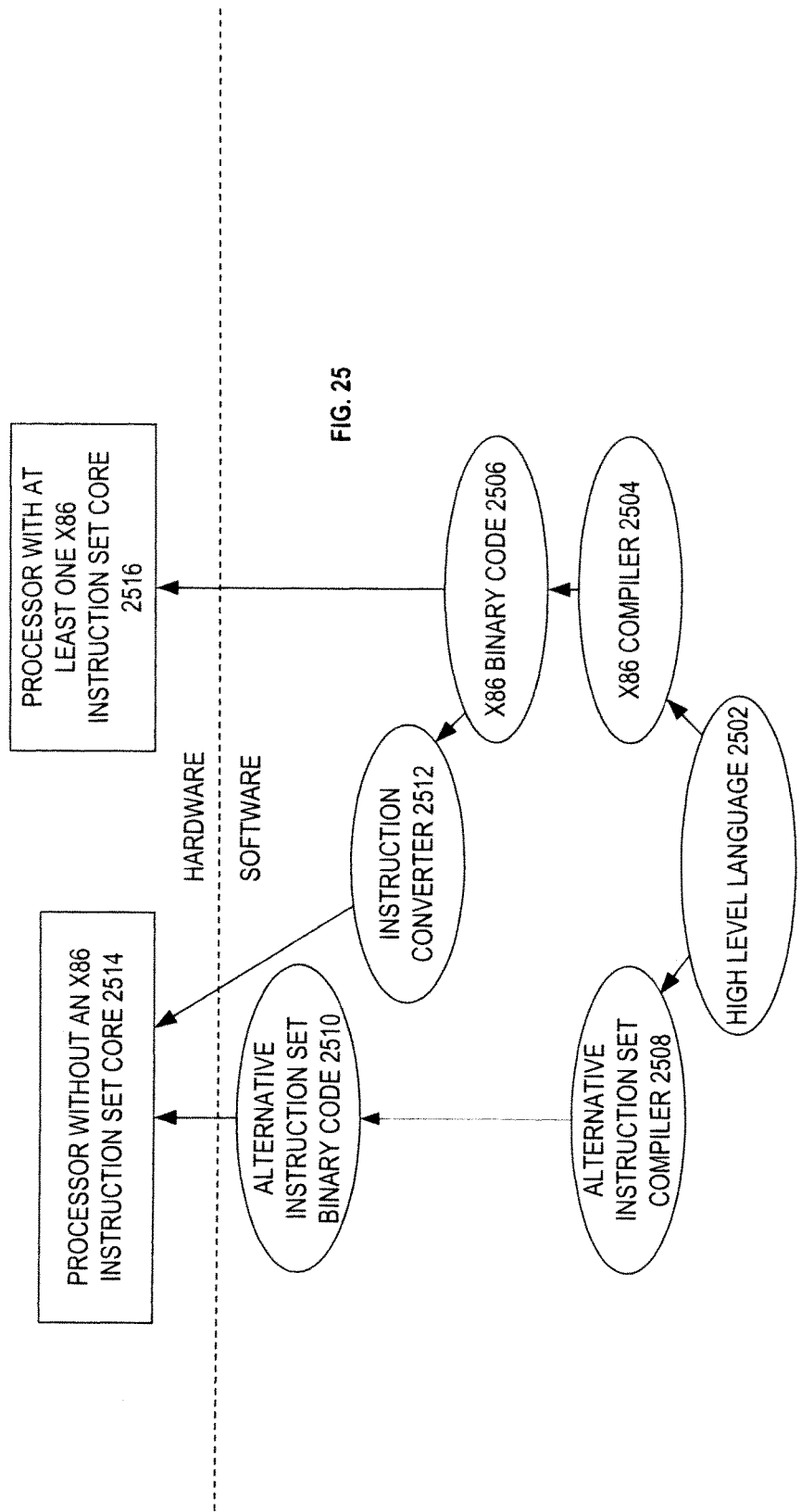

US 9,766,888 B2

PROCESSOR INSTRUCTION TO STORE INDEXES OF SOURCE DATA ELEMENTS IN POSITIONS REPRESENTING A SORTED ORDER OF THE SOURCE DATA ELEMENTS

BACKGROUND

Technical Field

Embodiments described herein generally relate to processors. In particular, embodiments described herein generally relate to sorting data in processors.

Background Information

Data sorting operations are used extensively in computers, servers, datacenters, sort networks, and the like. For example, sort operations are commonly used in spreadsheets, databases, Structured Query Language (SQL) databases or servers, datacenters, high performance computing (HPC), Apache Hadoop software framework, image processing (e.g., for median filter, gesture recognition, etc.), and neural networks, to name just a few examples. Sort operations, especially when sorting large data sets, can be computationally intensive and may tend to affect overall performance.

BRIEF DESCRIPTION OF THE DRAWINGS

The invention may best be understood by referring to the following description and accompanying drawings that are used to illustrate embodiments. In the drawings:

FIG. 16A is a block diagram illustrating an exemplary specific vector friendly instruction format, according to embodiments of the invention.

FIG. 16B is a block diagram illustrating fields of a specific vector friendly instruction format that make up a full opcode field, according to one embodiment of the invention.

FIG. 16C is a block diagram illustrating fields of a specific vector friendly instruction format that make up a register index field, according to one embodiment of the invention.

FIG. 17 is a block diagram of an embodiment of a register architecture.

FIG. 18A is a block diagram illustrating an embodiment of an in-order pipeline and an embodiment of a register renaming out-of-order issue/execution pipeline.

FIG. 18B is a block diagram of an embodiment of processor core including a front end unit coupled to an execution engine unit and both coupled to a memory unit.

FIG. 25 is a block diagram of use of a software instruction converter to convert binary instructions in a source instruction set to binary instructions in a target instruction set, according to embodiments of the invention.

DETAILED DESCRIPTION OF EMBODIMENTS

Disclosed herein are sort acceleration instructions, processors to execute the instructions, methods performed by the processors when processing or executing the instructions, and systems incorporating one or more processors to process or execute the instructions. In the following description, numerous specific details are set forth (e.g., specific instruction operations, packed data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
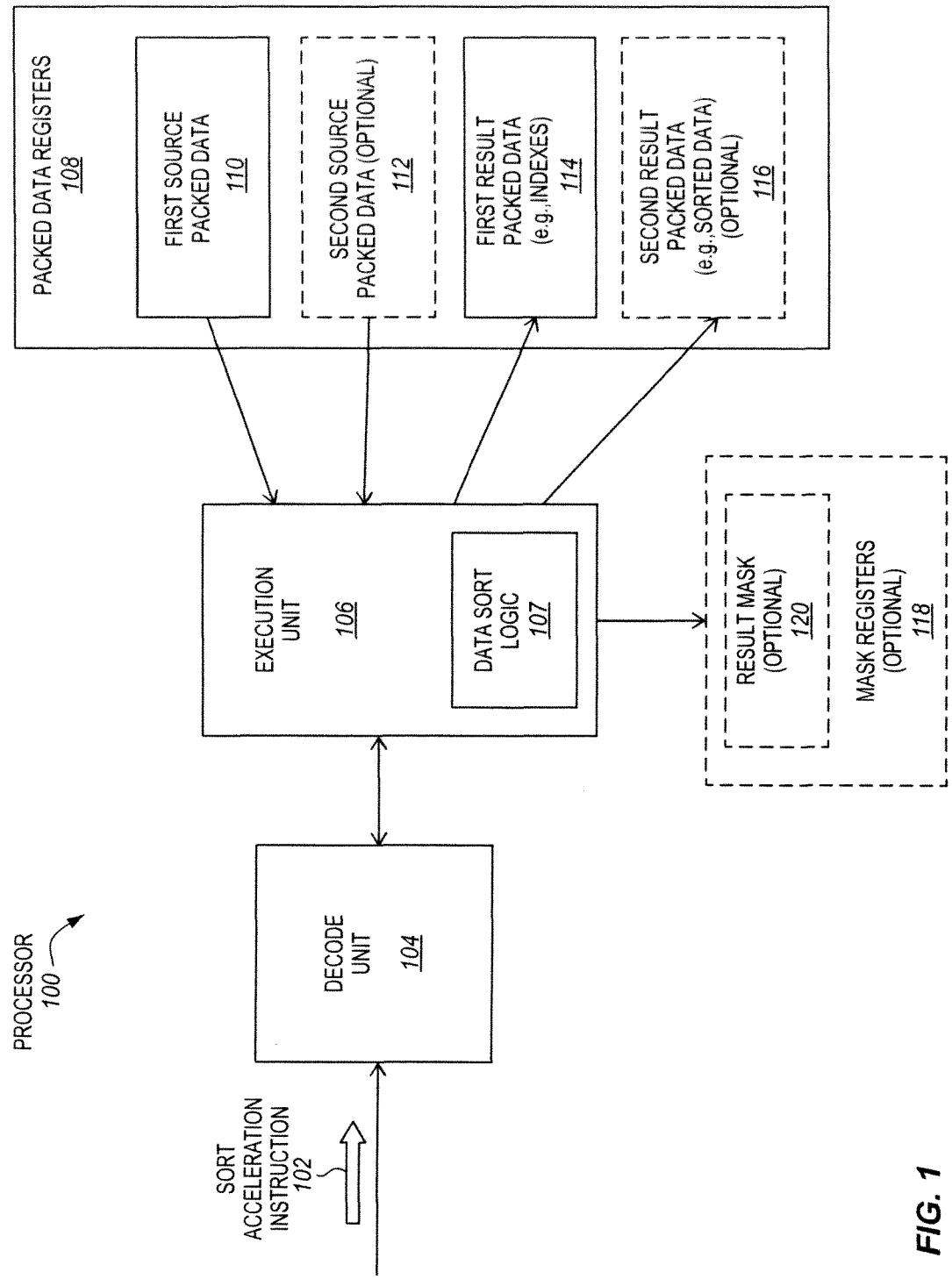
FIG. 1 is a block diagram of an embodiment of a processor that is operable to perform an embodiment of a sort acceleration instruction.

FIG. 1 is a block diagram of an embodiment of a processor 100 that is operable to perform an embodiment of a sort acceleration instruction 102. In some embodiments, the processor may be a general-purpose processor (e.g., of the type often used in desktop, laptop, or other computers). Alternatively, the processor may be a special-purpose processor. Examples of suitable special-purpose processors include, but are not limited to, network processors, communications processors, graphics processors, cryptographic processors, co-processors, embedded processors, digital signal processors (DSPs), and controllers (e.g., microcontrollers). The processor may be any of various complex instruction set computing (CISC) processors, reduced instruction set computing (RISC) processors, very long instruction word (VLIW) processors, hybrids thereof, other types, or have a combination of such different processors (e.g., in different cores).

During operation, the processor 100 may receive the embodiment of the sort acceleration instruction 102. For example, the instruction may be received from an instruction fetch unit, an instruction queue, or the like. The sort acceleration instruction may represent a macroinstruction, assembly language instruction, machine code instruction, or instruction or control signal of an instruction set of the processor. In some embodiments, the sort acceleration instruction may explicitly specify (e.g., through one or more fields or a set of bits), or otherwise indicate (e.g., implicitly indicate, etc.), a source packed data 110, and may specify or otherwise indicate a destination (e.g., a destination storage location) where a result packed data 114 is to be stored. In some embodiments, the instruction may optionally specify or otherwise indicate a second source packed data 112, and in some embodiments may optionally specify or otherwise indicate a second destination (e.g., a destination storage location) where a second result packed data 116 is to be stored.

Referring again to FIG. 1, the processor includes a decode unit or decoder 104. The decode unit may decode the sort acceleration instruction. The decode unit may output one or more microinstructions, micro-operations, micro-code entry points, decoded instructions or control signals, or other relatively lower-level instructions or control signals that reflect, represent, and/or are derived from the sort acceleration instruction. The one or more lower-level instructions or control signals may implement the higher-level instruction through one or more lower-level (e.g., circuit-level or hardware-level) operations. In some embodiments, the decode unit may include one or more input structures (e.g., port(s), interconnect(s), an interface) to receive the instruction, an instruction recognition and decode logic coupled with the input structures to recognize and decode the instruction, and one or more output structures (e.g., port(s), interconnect(s), an interface) coupled with the instruction recognition and decode logic to output the one or more corresponding lower level instructions or control signals. The decode unit may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the sort acceleration instruction being provided directly to the decode unit, an instruction emulator, translator, morpher, interpreter, or other instruction conversion module may optionally be used. Various types of instruction conversion modules are known in the arts and may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the sort acceleration instruction which may be of a first instruction set and may emulate, translate, morph, interpret, or otherwise convert the sort acceleration instruction into one or more corresponding or derived intermediate instructions or control signals which may be of a second different instruction set. The one or more intermediate instructions or control signals of the second instruction set may be provided to a decode unit, which may decode them into one or more lower-level instructions or control signals executable by native hardware of the processor (e.g., one or more execution units).

The processor 100 also includes a set of packed data registers 108. Each of the packed data registers may represent an on-die storage location that is operable to store packed data, vector data, or SIMD data. The packed data registers may represent architecturally-visible registers (e.g., an architectural register file). The architecturally-visible or architectural registers are visible to software and/or a programmer and/or are the registers indicated by instructions of an instruction set of the processor to identify operands. These architectural registers are contrasted to other non-architectural or non-architecturally visible registers in a given microarchitecture (e.g., temporary registers, reorder buffers, retirement registers, etc.). The packed data registers may be implemented in different ways in different microarchitectures using well-known techniques and are not limited to any particular type of circuit. Examples of suitable types of registers include, but are not limited to, dedicated physical registers, dynamically allocated physical registers using register renaming, and combinations thereof.

As shown, in some embodiments, the first source packed data 110, the optional second source packed data 112, the first result packed data 114, and the optional second result packed data 116 may each optionally be stored in the packed data registers. Alternatively, memory locations, or other storage locations, may be used for one or more of these operands. Moreover, although they are shown as being separate in the illustration, in some embodiments, a packed data register used for a source packed data may be reused as a destination storage location (e.g., a result packed data may be written over the source packed data).

Referring again to FIG. 1, the execution unit 106 is coupled with the decode unit 104 and the packed data registers 108. The execution unit may receive the one or more decoded or otherwise converted instructions or control signals that represent and/or are derived from the sort acceleration instruction. The execution unit may also receive the first source packed data 110, and in some embodiments the second source packed data 112. The execution unit is operable or configured in response to and/or as a result of the sort acceleration instruction (e.g., in response to one or more instructions or control signals decoded from the instruction) to store the first result packed data 114 in the first destination indicated by the instruction, and in some embodiments store the second result packed data 116 in the second destination indicated by the instruction. In some embodiments, the execution unit may also optionally store a result mask 120 (e.g., in an optional set of mask registers 118). In various embodiments, the result packed data and/or result mask may be any of FIGS. 3-4 or 6-13.

The execution unit and/or the processor may include specific or particular logic (e.g., transistors, integrated circuitry, or other hardware potentially combined with firmware (e.g., instructions stored in non-volatile memory) and/or software) that is operable to perform the sort acceleration instruction and/or store the result in response to and/or as a result of the instruction. By way of example, the execution unit may include an arithmetic logic unit, a logic unit, a data rearrangement unit, or the like. In some embodiments, the execution unit may include one or more input structures (e.g., port(s), interconnect(s), an interface) to receive source operands, sort circuitry or logic 107 coupled with the input structure(s) to receive and process the source packed data and generate the result packed data, and one or more output structures (e.g., port(s), interconnect(s), an interface) coupled with the sort circuitry or logic 107 to output the result packed data. By way of example, the sort circuitry or logic may include a compare and swap chain, a value based selection or routing hierarchy, or other sort circuitry or logic.

Figure 2:
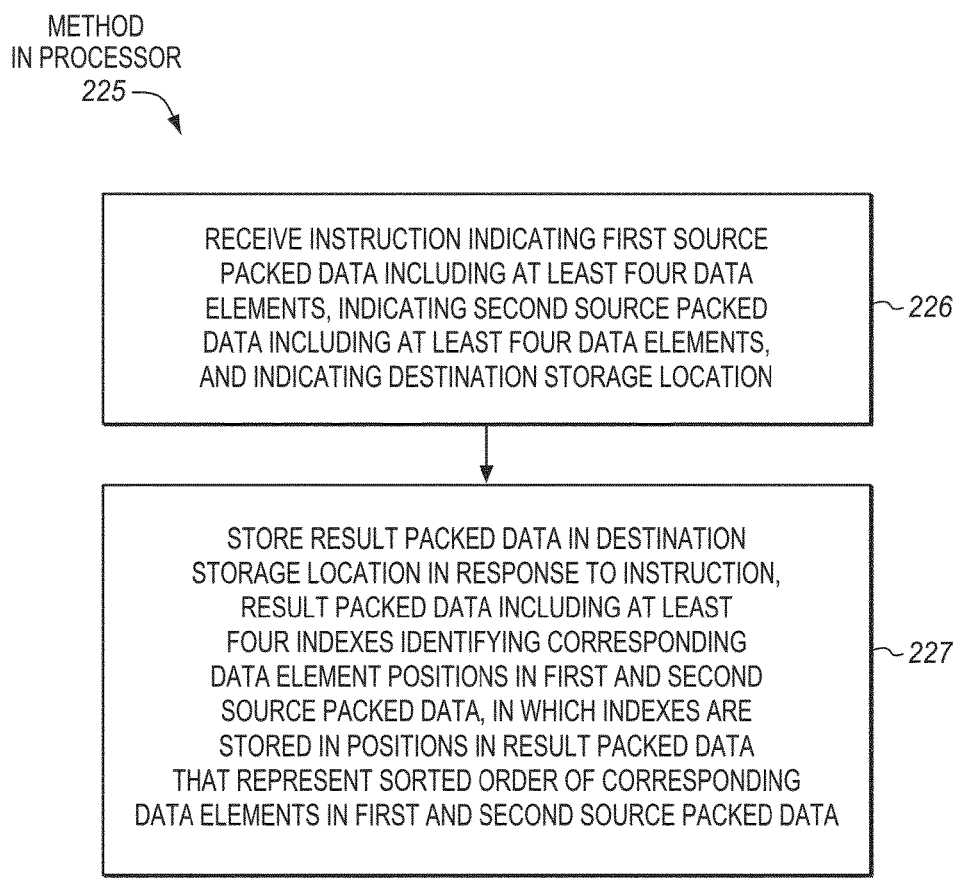
FIG. 2 is a block flow diagram of an embodiment of a method of performing an embodiment of a single source sort indexes instruction.

FIG. 2 is a block flow diagram of an embodiment of a method 225 of performing an embodiment of a single source sort indexes instruction. In various embodiments, the method may be performed by a processor (e.g., the processor of FIG. 1), instruction processing apparatus, or integrated circuit. The components, features, and specific optional details described herein for the processor of FIG. 1, also optionally apply to the operations and/or method of FIG. 2.

The method includes receiving the single source sort indexes instruction, at block 226. The instruction may be received at a processor or a portion thereof (e.g., an instruction fetch unit, a decode unit, a bus interface unit). In various aspects, the instruction may be received from an off-die source (e.g., from memory, interconnect, etc.), or from an on-die source (e.g., from an instruction cache, instruction queue). The instruction may specify or otherwise indicate a source packed data including at least four data elements that are not in a sorted order (e.g., not sorted in increasing or decreasing magnitude across the packed data). The instruction may also specify or otherwise indicate a destination storage location.

A result packed data is stored in the destination storage location in response to and/or as a result of the instruction, at block 227. Representatively, an execution unit or processor may perform the instruction and store the result. The result packed data may include at least four indexes. In some embodiments, the indexes may identify corresponding data elements in the source packed data. In some embodiments, the indexes may be stored in positions in the result packed data that represent the sorted order of the corresponding data elements of the source packed data. That is, the indexes may be stored in a sorted order where they are sorted not based on the values of the indexes themselves, but rather based on the values of their corresponding data elements in the source packed data. In some embodiments, the result packed data may include indexes corresponding to all data elements in the source packed data.

Figure 3:
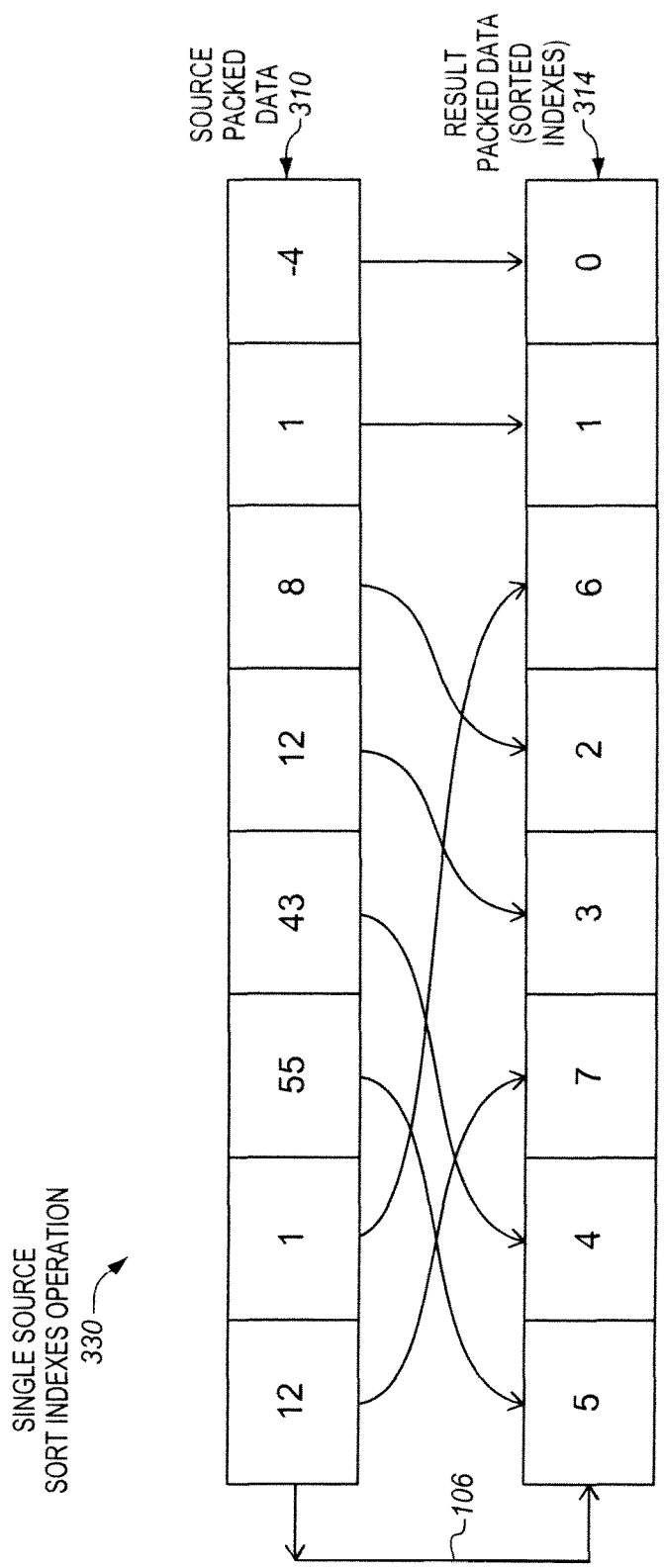
FIG. 3 is a block diagram of an embodiment of a single source sort indexes operation.

FIG. 3 is a block diagram illustrating an embodiment of a single source sort indexes operation 330 that may be performed in response to an embodiment of a single source sort indexes instruction. The single source sort indexes instruction may specify or otherwise indicate a source packed data 310 having at least four data elements. The source packed data may be stored in a packed data register, memory location, or other storage location. Commonly, the number of data elements in the source packed data may be equal to the size or width in bits of the source packed data divided by the size or width in bits of each data element. In various embodiments, the width of the source packed data may be 64-bits, 128-bits, 256-bits, 512-bits, or 1024-bits. In various embodiments, the width of each data element may be 8-bits, 16-bits, 32-bits, or 64-bits. In one specific non-limiting example, the source packed data may be 512-bits wide and may have sixteen 32-bit data elements or eight 64-bit data elements. The data elements may have integer, fixed point, or floating point formats.

In the particular illustrated example, the source packed data has eight data elements. The eight data elements have, from a least significant or lowest order bit position on the right to a most significant or highest order bit position on the left, the values −4, 1, 8, 12, 43, 55, 1, and 12. The values are not in a sorted order (e.g., are not sorted in increasing or decreasing order across the packed data).

A result packed data 314 may be generated (e.g., by an execution unit 106) and stored in a destination storage location in response to the single source sort indexes instruction. The destination storage location may be specified or otherwise indicated by the instruction. In various embodiments, the destination storage location may be a packed data register, a memory location, or other storage location. The destination storage location may either be the same storage location used for the source packed data, or a different storage location.

In some embodiments, the result packed data may include at least four indexes. In the particular illustrated example, the result packed data has eight indexes. Each index may point to, identify, or be associated with, a single corresponding data element in the source packed data. Each of the data elements may have a position within the source packed data that is indicated by the corresponding index. The index may represent the relative position or offset of the data element within the operand. For example, according to one possible convention, which is used in the illustration, index values of 0 through 7 may represent the eight data elements in the first through the eighth positions moving across the packed data from least to most significant bit positions (right to left as viewed). To further illustrate, the data element with value −4 has index of 0, the data element with value 8 has index of 2, the data element with value 43 has index of 4, and so on. Alternatively, various other indexing conventions may optionally be used (e.g., starting with 1 instead of 0, indexing backwards from 7 to 0, an arbitrary mapping convention, etc.). The indexes may have a number of bits sufficient to represent the indexed positions (e.g., 3-bits in the illustrated example).

In some embodiments, the indexes may be stored in positions in the result packed data that are to represent a sorted order of the corresponding data elements in the source packed data. In the illustrated example, the sorted order is an increasing order that increases from least to most significant bit positions, although a decreasing order may optionally be used instead. For the values in the illustrated example, the increasing sorted order would be −4, 1, 1, 8, 12, 12, 43, and 55. As a result, the index value of 0 corresponding to the data element with the value of −4 is stored in the first or lowest order position in the result packed data, the index value of 1 corresponding to the rightmost data element with the value of 1 is stored in the second or next lowest order position, and so on. In the illustration, arrows are used to show the correspondence between the indexes and the data elements.

Notice that the result packed data stores the sorted indexes not the sorted source data elements. In some embodiments, the sorted indexes may optionally be used subsequently by a different instruction to sort the source data elements. For example, in some embodiments, a permute instruction, shuffle instruction, or the like, may use the indexes to sort the source data elements. For example, the permute or shuffle instruction may indicate the result packed data 314 with the indexes as a first source operand and the source packed data 310 a second source operand, and may store a result packed data having the data elements sorted based on the control of the indexes. One particular example of a suitable instruction is the VPERMD instruction, which is described in Intel® Architecture Instruction Set Extensions Programming Reference, 319433-017, published December 2013, available from Intel Corporation, of Santa Clara, Calif.

However, in some implementations, it is advantageous to store the indexes instead of the sorted data elements. For example, the sorted indexes may be used to sort other data in addition to, or instead of, the source data elements of the source packed data 310. For example, this may be case in various different data structures in which the source data elements are used as sort keys and are each associated with multiple data elements. To further illustrate, consider a simple example of a table (e.g., in a spreadsheet) arranged in columns and rows. One column lists inventor names and another column lists inventor identification numbers. Both the names and identification numbers may need to be sorted together and consistently with one another. As one example, a sort may be based on name as the sort key and sorted indexes may be stored as a result. The sorted indexes may then be used to sort both the names and the identification numbers. Accordingly, in some implementations, storing the sorted indexes may offer advantages, such as flexibility and an ability to sort other associated data, as compared to storing the sorted data elements.

In some embodiments, the sorting may be done in stable order (e.g., ascending order). By stable it is meant that if two elements have equal search keys, then the relative order between them does not change. For example, if you have two rows with the same inventor name, but different identification numbers, and you sort the table according to the name, then the order of the identification numbers may not change. This is contrasted to an unstable order, in which the relative order is not guaranteed, and elements with equal keys may be shuffled.

Figure 4:
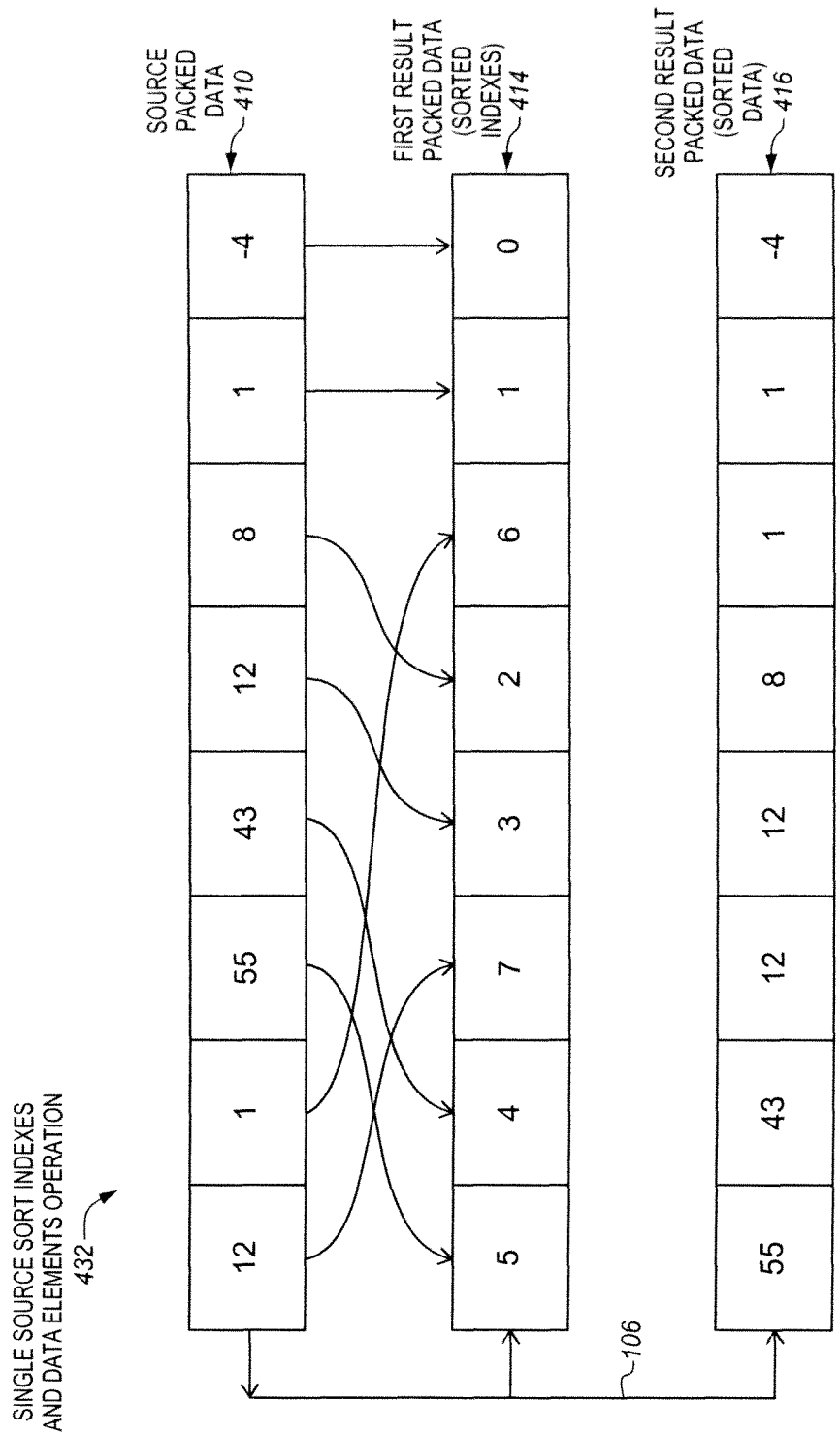
FIG. 4 is a block diagram of an embodiment of a single source sort indexes and data elements operation.

FIG. 4 is a block diagram illustrating an embodiment of a single source sort indexes and data elements operation 432 that may be performed in response to an embodiment of a single source sort indexes and data elements instruction. The operation of FIG. 4 has certain similarities to the operation of FIG. 3. To avoid obscuring the description, the different and/or additional characteristics for the operation of FIG. 4 will primarily be described, without repeating all the optionally similar or common characteristics and details relative to the operation of FIG. 3. However, the previously described characteristics and details of the operation of FIG. 3 may also optionally apply to the operation of FIG. 4, unless stated otherwise or otherwise clearly apparent.

The single source sort indexes and data elements instruction may specify or otherwise indicate a source packed data 410 having at least four data elements. The source packed data and data elements may be as described elsewhere herein (e.g., as in FIG. 3).

A first result packed data 414 may be generated (e.g., by an execution unit 106) and stored in a first destination storage location in response to the instruction. The first result packed data 414 may have at least four indexes. The first result packed data may be as described elsewhere herein (e.g., as in FIG. 3).

In this embodiment, a second result packed data 416 may also be generated and stored in a second destination storage location in response to the instruction. The second destination storage location may be specified or otherwise indicated by the instruction, and may be a packed data register, a memory location, or other storage location. The second result packed data may include the corresponding data elements, which correspond to the indexes stored in the first result packed data 414, stored in positions of the second result packed data 416 that reflect the sorted order. For example, in increasing sorted order the second result packed data may store the values, from right to left in the illustration, −4, 1, 1, 8, 12, 12, 43, and 55. In another embodiment, a decreasing order may be used instead for the indexes and data elements.

Sorted indexes are stored as a result in FIG. 3. Both sorted indexes and sorted data elements are stored as results in FIG. 4. In another embodiment, sort data elements, but not indexes, may optionally be stored responsive to an instruction.

Figure 5:
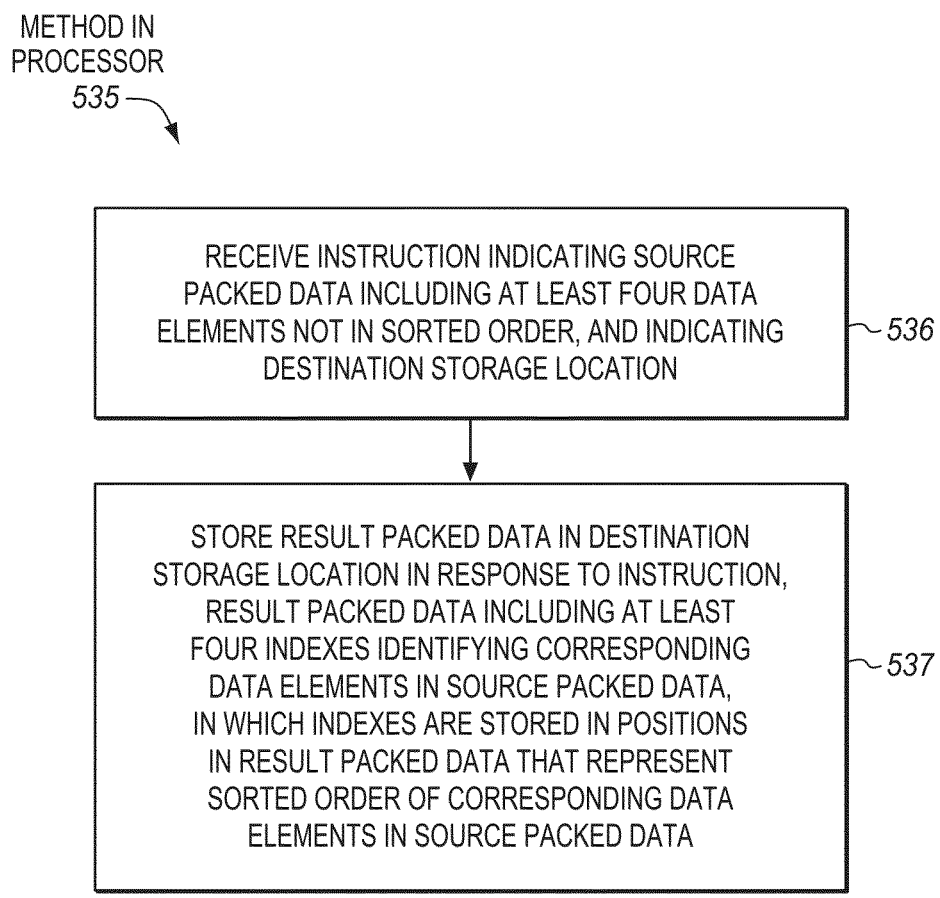
FIG. 5 is a block flow diagram of an embodiment of a method of performing an embodiment of a two source sort indexes instruction.

FIG. 5 is a block flow diagram of an embodiment of a method 535 of performing an embodiment of a two source sort indexes instruction. In various embodiments, the method may be performed by a processor (e.g., the processor of FIG. 1), instruction processing apparatus, digital logic device, or integrated circuit. The components, features, and specific optional details described herein for the processor of FIG. 1, also optionally apply to the operations and/or method of FIG. 5.

The method includes receiving the two source sort indexes instruction, at block 536. In various aspects, the instruction may be received at a processor or a portion thereof (e.g., an instruction fetch unit, a decode unit, a bus interface unit). In various aspects, the instruction may be received from an off-die source (e.g., from memory, interconnect, etc.), or from an on-die source (e.g., from an instruction cache, instruction queue). The two source sort indexes instruction may specify or otherwise indicate a first source packed data including a first set of at least four data elements, and may specify or otherwise indicate a second source packed data including a second set of at least four data elements. The instruction may also specify or otherwise indicate a destination storage location.

Referring again to FIG. 5, a result packed data is stored in the destination storage location in response to and/or as a result of the two source sort indexes instruction, at block 537. Representatively, an execution unit or processor may perform the instruction and store the result. The result packed data may include at least four indexes. In some embodiments, the indexes may identify corresponding data element positions in the first and second source packed data. In some embodiments, the indexes may actually identify single corresponding data elements in one of the first and second source packed data (see e.g., FIGS. 6-9). Alternatively, the indexes may only identify corresponding data element positions in each of the first and second source packed data, and another bit may be used to indicate one of the first and second source packed data, and thereby indicate a single corresponding data element (see e.g., FIGS. 10-13). The indexes may be stored in positions in the result packed data that represent a sorted order of corresponding data elements in the first and second source packed data. The result may represent a merging sort that stores sorted indexes corresponding to data elements in either of two sources.

Figure 6:
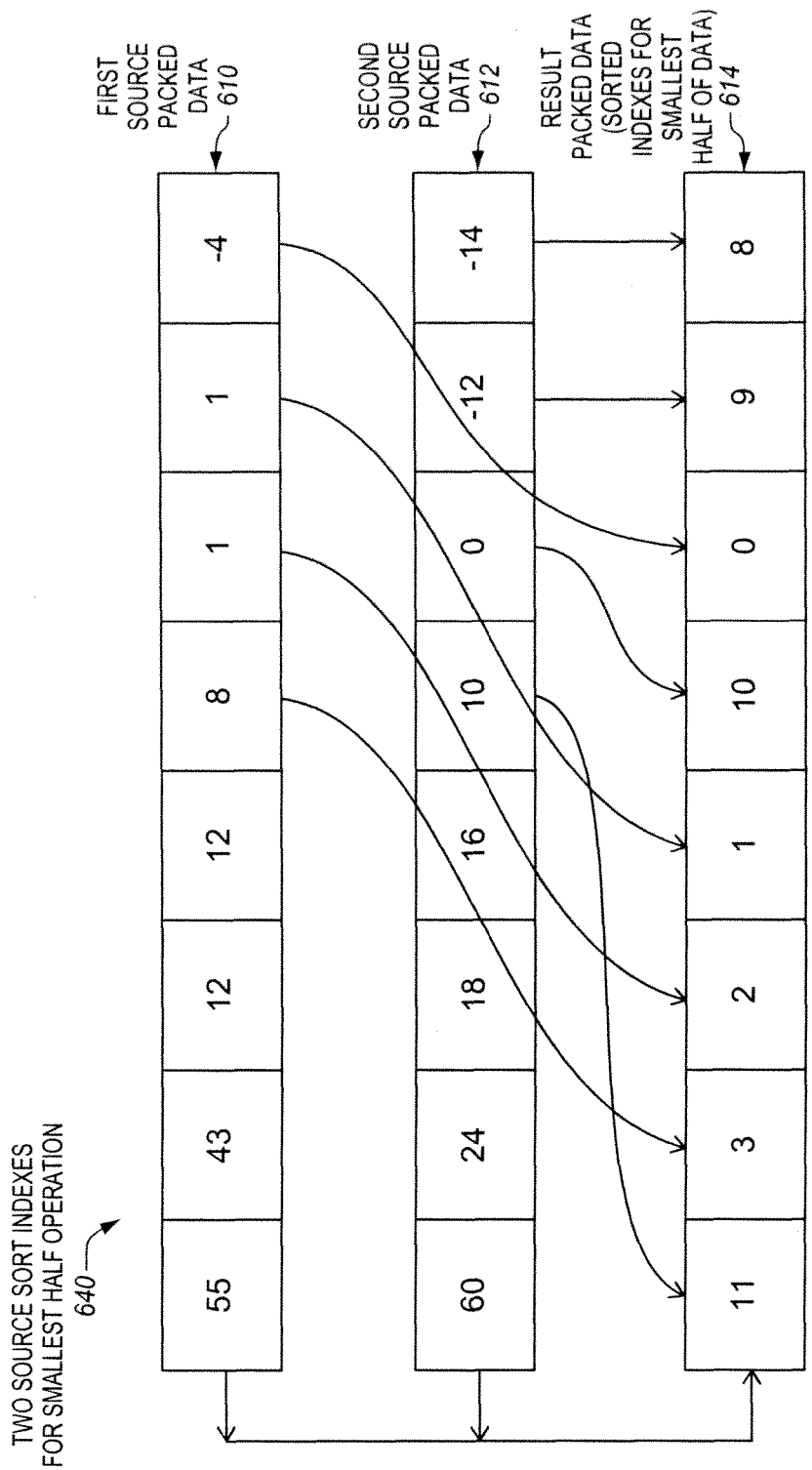
FIG. 6 is a block diagram of an embodiment of a two source sort indexes for a smallest half of data elements operation.

FIG. 6 is a block diagram illustrating an embodiment of a two source sort indexes for a smallest half of data elements operation 640 that may be performed in response to an embodiment of a two source sort indexes for a smallest half of data elements instruction. The instruction may specify or otherwise indicate a first source packed data 610 having a first set of at least four data elements, and may specify or otherwise indicate a second source packed data 612 having a second set of at least four data elements. The first and second source packed data may each, independently of the other, be stored in a packed data register, memory location, or other storage location. The first and second source packed data may have the sizes, numbers of data elements, sizes of data elements, and types of data elements disclosed elsewhere herein.

In the particular illustrated example, the first source packed data and the second source packed data each have eight data elements. The first source packed data has, from a least significant position on the right to a most significant position on the left, the values of −4, 1, 1, 8, 12, 12, 43, 55. The second source packed data has, from a least significant position on the right to a most significant position on the left, the values of −14, −12, 0, 10, 16, 18, 24, and 60. In this embodiment, the values in the first source packed data, and the values in the second source packed data, are each sorted in increasing order from least to most significant bit positions. In some embodiments, the data elements within each of the first and second source packed data may be assumed (e.g., implicitly assumed for the instruction) or required to be in sorted order within the respective packed data operand (e.g., for the instruction to operate correctly). In other embodiments, the data elements within each of the first and second source packed data may not be assumed or required to be in sorted order (e.g., the instruction may operate correctly when the elements are in an unsorted order).

A result packed data 614 may be generated (e.g., by an execution unit 106) and stored in a destination storage location in response to the instruction. In various embodiments, the destination storage location may be a packed data register, a memory location, or other storage location. The destination storage location may either be the same storage location used for one of the first and second source packed data, or a different storage location.

In some embodiments, the result packed data may include at least four indexes. In some embodiments, the result packed data may include a same number of indexes as a number of data elements in one of the source packed data, although this is not required. In the particular illustrated example, the result packed data has eight indexes. Each index may point to, identify, or be associated with, corresponding data element positions in the first and second source packed data. In some embodiments, the indexes may actually identify single corresponding data elements in one of the first and second source packed data. Each of the data elements may have an indexed position within the first and second source packed data. The index may represent the relative position or offset of the data element within the first and second packed data. For example, according to one possible convention, which is used in the illustrated example, index values of 0 through 7 may index the eight data elements when moving across the first source packed data 610 from least to most significant bit positions (right to left as viewed), and index values of 8 through 15 may index the eight data elements when moving across the second source packed data 612 from least to most significant bit positions (right to left as viewed). In the illustrated example, arrows are used to show the correspondence between indexes and data elements. As shown, the data element with the value −14 has an index of 8, the data element with the value of −12 has an index of 9, and so on. Alternatively, various other indexing conventions desired for the particular implementation may optionally be used (e.g., starting with an index of 1 instead of 0, indexing backwards, an arbitrarily mapped indexing convention, etc.).

The indexes may be stored in positions in the result packed data that are to represent a sorted order of the corresponding data elements in the first and second source packed data. In some embodiments, the indexes may be stored for only an ordered subset of all of the data elements in the first and second source packed data. In some embodiments, the ordered subset may be an ordered smallest subset (e.g., a smallest half) of all of the data elements. In the illustrated example, the eight smallest values are −14, −12, −4, 0, 1, 1, 8, and 10. In the illustrated embodiment, the eight indexes are stored in positions in the result packed data that represent a sorted increasing order (that increases from least to most significant bit positions) of the corresponding eight smallest data elements in the first and second source packed data. As shown, the index of 8 corresponding to the data element with value −14 is stored in the lowest order position in the result packed data, the index of 9 corresponding to the data element with value −12 is stored in the next lowest order position, the index of 0 corresponding to the data element with value −4 is stored in the third lowest order position, and so on. In other embodiments, a decreasing or reverse order may optionally be used. The sort operation merges sorted indexes for both the first and second source packed data.

Figure 7:
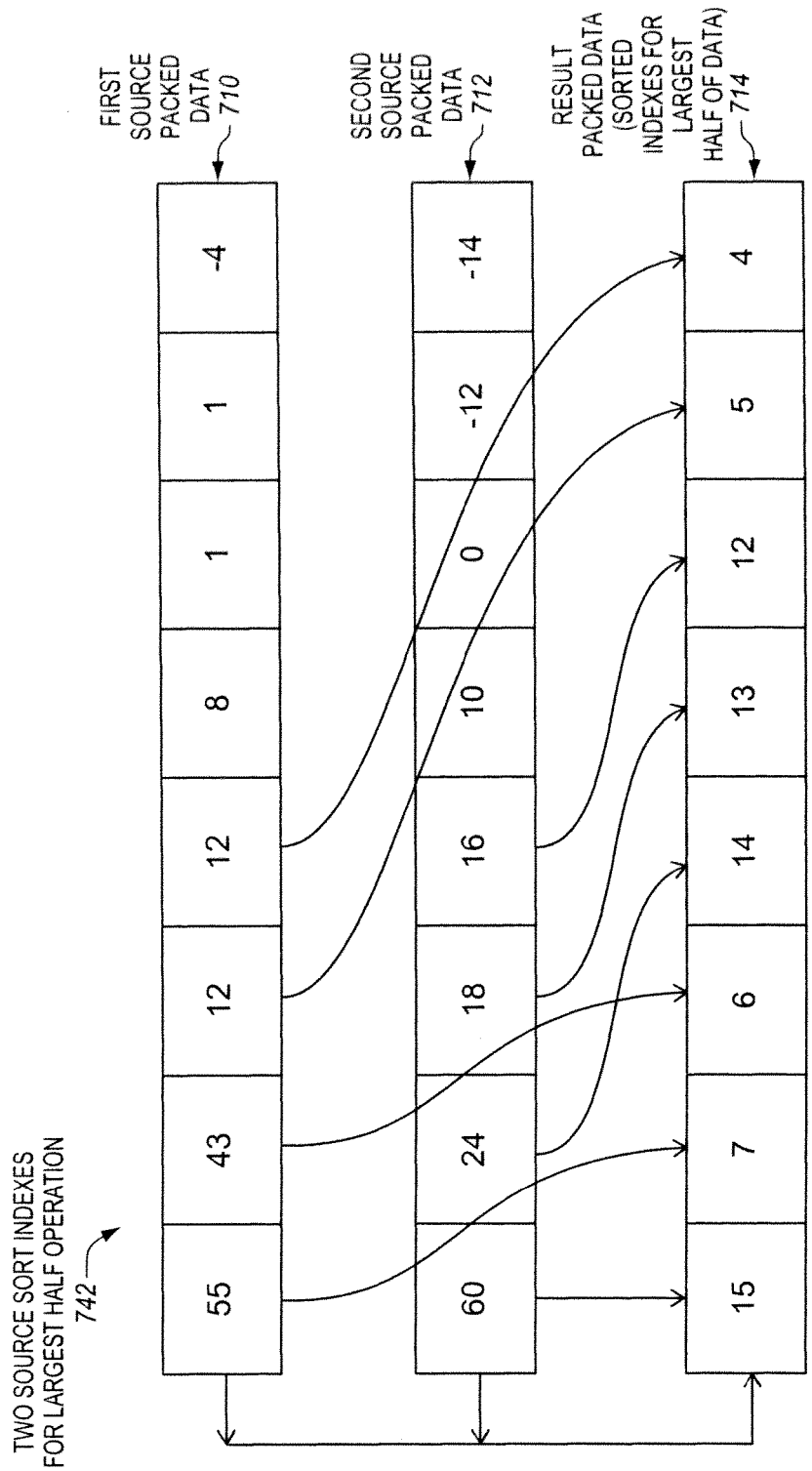
FIG. 7 is a block diagram of an embodiment of a two source sort indexes for a largest half of data elements operation.

FIG. 7 is a block diagram illustrating an embodiment of a two source sort indexes for a largest half of data elements operation 742 that may be performed in response to an embodiment of a two source sort indexes for a largest half of data elements instruction. The instruction may specify or otherwise indicate a first source packed data 710 having a first set of at least four data elements, and may specify or otherwise indicate a second source packed data 712 having a second set of at least four data elements. The first and second source packed data may have the characteristics and variations described elsewhere herein. In the illustrated embodiment, the values in the first source packed data, and the values in the second source packed data, are sorted in increasing order, although this is not required in other embodiments or for other instructions.

A result packed data 714 may be generated (e.g., by an execution unit 106) and stored in a destination storage location in response to the instruction. In some embodiments, the result packed data may include at least four indexes. In some embodiments, the indexes may identify single corresponding data elements in one of the first and second source packed data. In some embodiments, the indexes may be stored in positions in the result packed data that are to represent a sorted order of the corresponding data elements in the first and second source packed data.

In the embodiment of FIG. 7, instead of the ordered subset being a smallest subset, the ordered subset may be an ordered largest subset, for example a largest half, of all of the data elements in the first and second source packed data. For example, the eight indexes may be stored in positions in the result packed data that are to represent a sorted order of the corresponding eight largest data elements in the first and second source packed data. Considering the example values of the data elements shown in the illustration, the eight largest data elements are those with the values 12, 12, 16, 18, 24, 43, 55, and 60. In the illustrated embodiment, the eight indexes are stored in positions in the result packed data that are to represent a sorted increasing order (that increases from least to most significant bit position) of the corresponding eight largest data elements in the first and second source packed data. As shown, the index of 4 corresponding to the rightmost data element with value 12 is stored in the lowest order position, the index of 5 corresponding to the leftmost data element with value 12 is stored in the next lowest order position, the index of 12 corresponding to the data element with value 16 is stored in the third lowest order position, and so on. In other embodiments, a decreasing order may optionally be used instead.

FIGS. 6-7 show embodiments in which indices for only smallest or largest halves are stored. In other embodiments, indices for both the smallest and largest halves may be stored in the result of a same size as the source operands. For example, this may be possible if the indexes are sufficiently smaller (e.g., half the size or smaller) than the corresponding data elements. Such an approach may offer an advantage in some implementations. Alternatively, the indices for the smallest and largest halves may be kept separate to facilitate utilization of a corresponding shuffle instruction, blend instruction, or the like.

Figure 8:
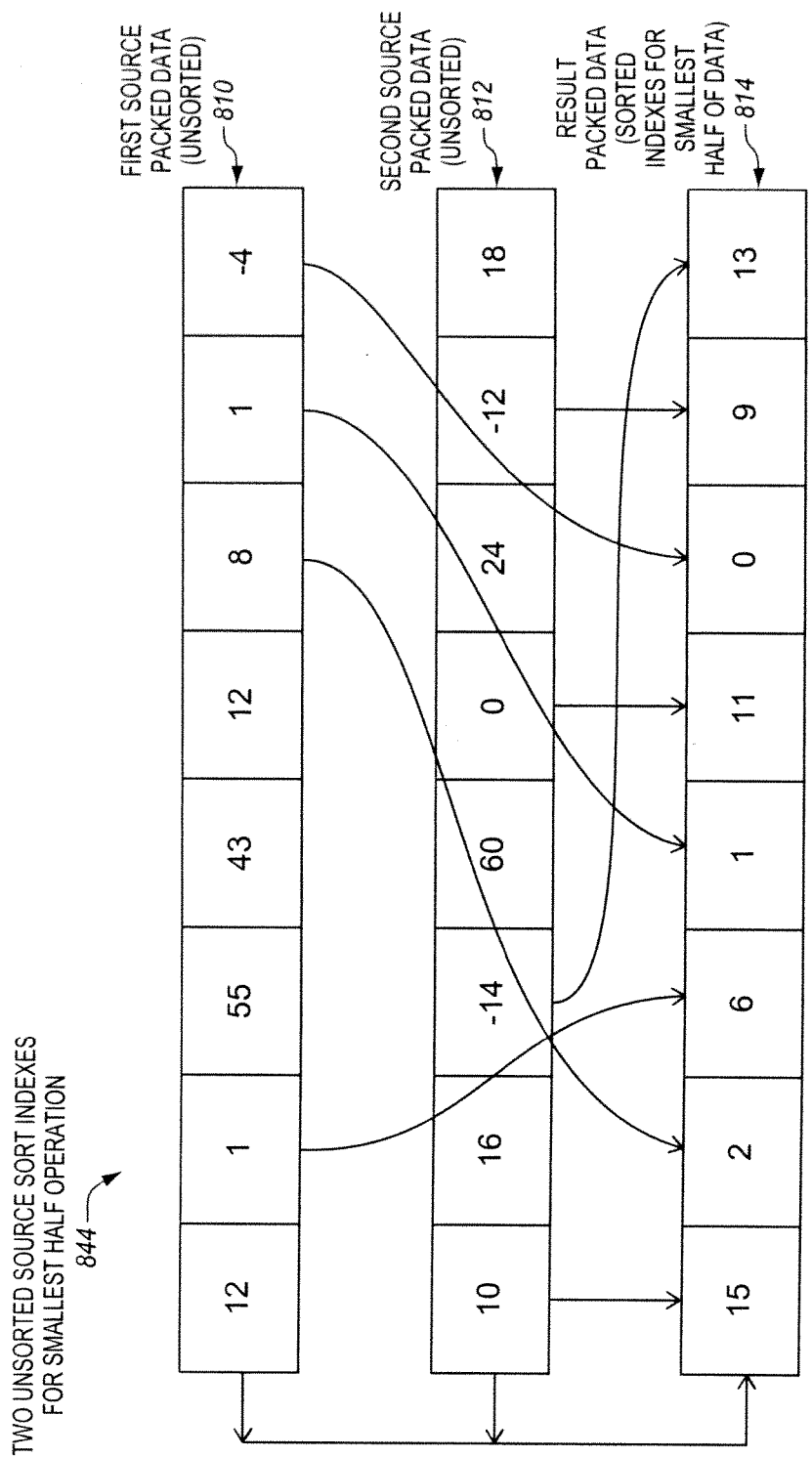
FIG. 8 is a block diagram of an embodiment of a two unsorted source sort indexes for a smallest half of data elements operation.

FIG. 8 is a block diagram illustrating an embodiment of a two unsorted source sort indexes for a smallest half of data elements operation 844 that may be performed in response to an embodiment of a two unsorted source sort indexes for a smallest half of data elements instruction. The instruction may specify or otherwise indicate a first source packed data 810 having a first set of at least four data elements, and may specify or otherwise indicate a second source packed data 812 having a second set of at least four data elements. In the particular illustrated example, the first source packed data and the second source packed data each have eight data elements. The first source packed data has, from a least significant position on the right to a most significant position on the left, the values of −4, 1, 8, 12, 43, 55, 1, and 12. In this embodiment, the values in the first source packed data are not in sorted order. Similarly, the values in the second source packed data are not sorted in order. In such an embodiment, the data elements within each of the first and second source packed data may not be assumed or required to be in sorted order (e.g., the instruction may operate correctly when the elements are in an unsorted order).

A result packed data 814 may be generated (e.g., by an execution unit 106) and stored in a destination storage location in response to the instruction. In some embodiments, the result packed data may include at least four indexes. In some embodiments, the indexes may identify single corresponding data elements in one of the first and second source packed data. In some embodiments, the indexes may be stored in positions in the result packed data that are to represent a sorted order of the corresponding data elements in the first and second source packed data. In the illustrated embodiment, the result packed data has indexes corresponding to a smallest subset, in this case a smallest half, of all data elements in the first and second source packed data. In another embodiment, the result packed data may have indexes corresponding to a largest subset, for example a largest half, of all data elements in the first and second source packed data.

Figure 9:
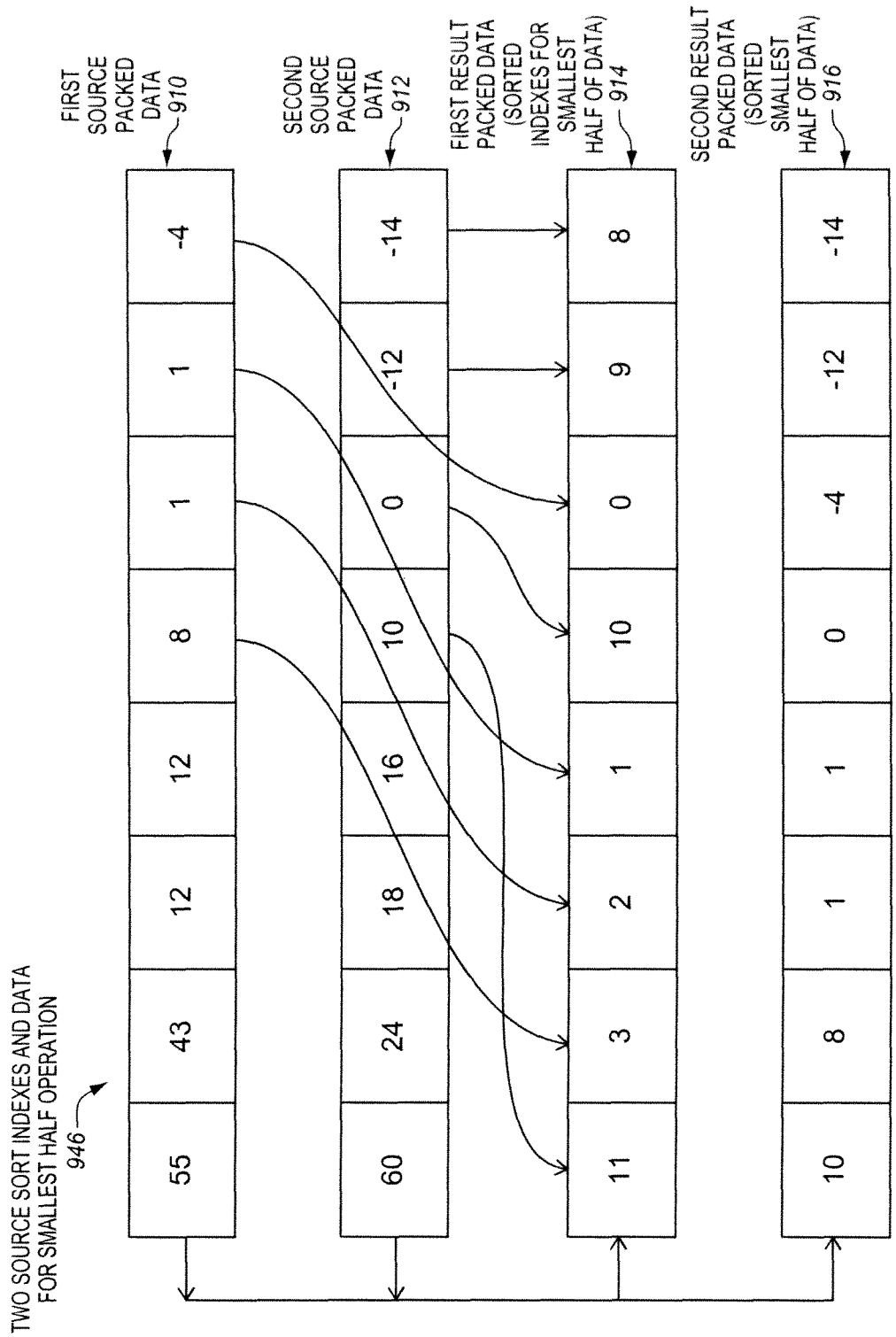
FIG. 9 is a block diagram of an embodiment of a two source sort indexes and data for a smallest half of data elements operation.

FIG. 9 is a block diagram illustrating an embodiment of a two source sort indexes and data for a smallest half of data elements operation 946 that may be performed in response to an embodiment of a two source sort indexes and data for a smallest half of data elements instruction. The instruction may specify or otherwise indicate a first source packed data 910 having a first set of at least four data elements, and may specify or otherwise indicate a second source packed data 912 having a second set of at least four data elements. The first and second source packed data may have the sizes, numbers of data elements, data element sizes, and data element types disclosed elsewhere herein. In the illustrated embodiment, the data elements within each of the first and second source packed data may be assumed (e.g., implicitly assumed for the instruction) or required to be in sorted order within the respective packed data operand. In other embodiments, the data elements within each of the first source packed data and the second source packed data may not be assumed or required to be in sorted order within the respective packed data operand.

A first result packed data 914 may be generated (e.g., by an execution unit 106) and stored in a first destination storage location in response to the instruction. The first result packed data 914 may have indexes. The first result packed data and indexes may have similar or common characteristics and details as previously described for FIG. 6. In the illustrated embodiment, the result packed data has indexes corresponding to a smallest subset, in this case a smallest half, of all data elements in the first and second source packed data. In another embodiment, the result packed data may have indexes corresponding to a largest subset, for example a largest half, of all data elements in the first and second source packed data.

In this embodiment, a second result packed data 916 may also be generated and stored in a second destination storage location in response to the instruction. The second destination storage location may be specified or otherwise indicated by the instruction, and may be a packed data register, a memory location, or other storage location. The second destination storage location may either be the same storage location used for one of the first or second source packed data, or may be a different storage location. The second result packed data may include the corresponding data elements, which correspond to the indexes stored in the first result packed data, stored in positions of the second result packed data that reflect the sorted order. In the illustrated embodiment, the second result packed data has a sorted smallest subset, in this case a sorted smallest half, of all data elements in the first and second source packed data. Specifically, the second result packed data stores, from right to left, the data elements −14, −12, −4, 0, 1, 1, 8, and 10. In another embodiment, the second result packed data may instead have a sorted largest subset, for example a sorted largest half, of all data elements in the first and second source packed data.

Sorted indexes are stored as a result in FIG. 6. Both sorted indexes and sorted data elements are stored as results in FIG. 9. In another embodiment, sort data elements, but not indexes, may optionally be stored responsive to an instruction FIGS. 7-9 show operations that have certain similarities to the operation of FIG. 6. To avoid obscuring the description, the different and/or additional characteristics for the operations of FIGS. 7-9 have primarily been described, without repeating all the optionally similar or common characteristics and details relative to the operation of FIG. 6. However, it is to be appreciated that the previously described characteristics and details of the operation of FIG. 6 may also optionally apply to any of the operations of FIGS. 7-9, unless stated otherwise or otherwise clearly apparent.

Figure 10:
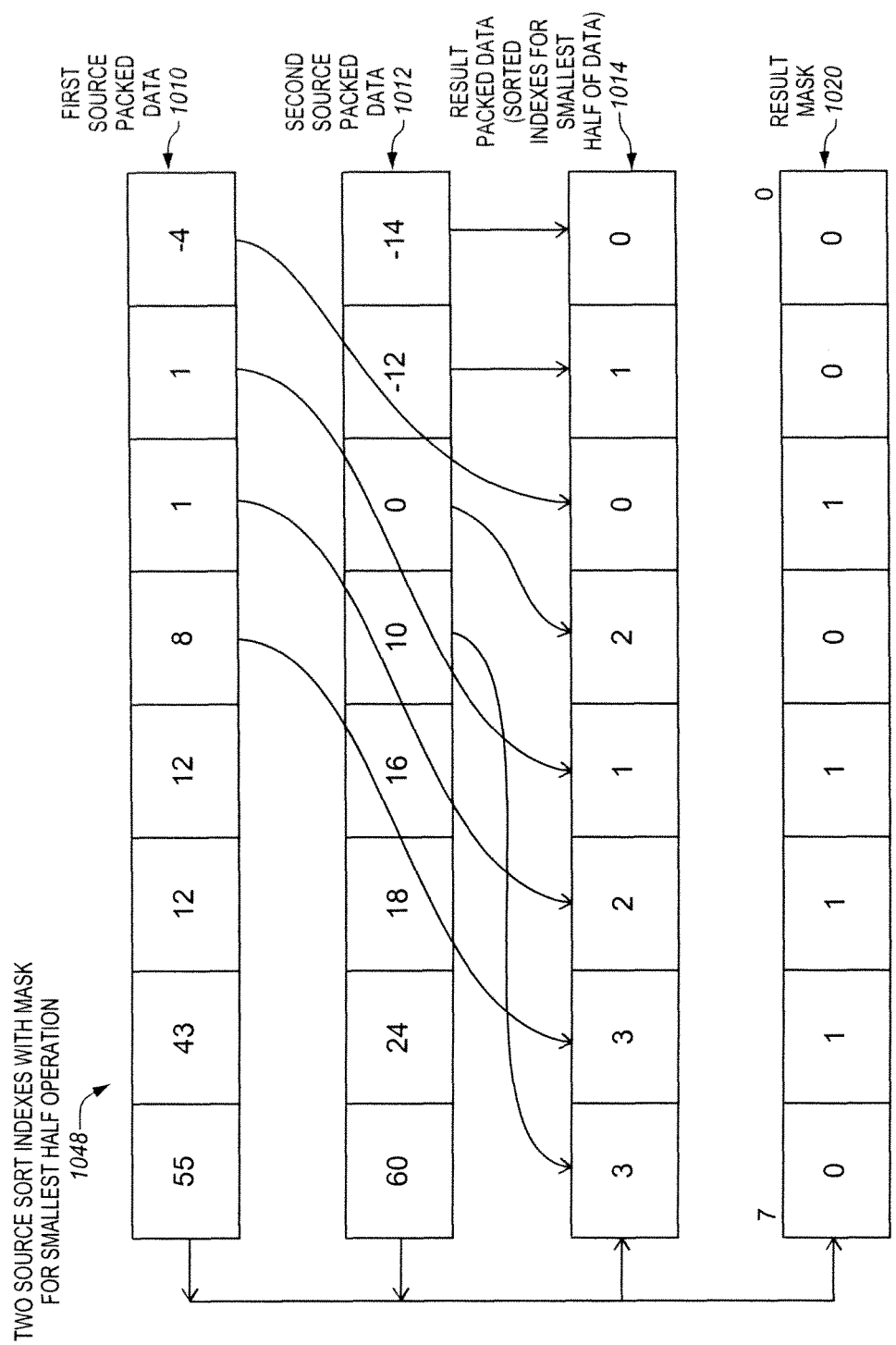
FIG. 10 is a block diagram of an embodiment of a two source sort indexes with mask for a smallest half of data elements operation.

FIG. 10 is a block diagram illustrating an embodiment of a two source sort indexes with mask for a smallest half of data elements operation 1048 that may be performed in response to an embodiment of a two source sort indexes with mask for a smallest half of data elements instruction. The instruction may specify or otherwise indicate a first source packed data 1010 having a first set of at least four data elements, and may specify or otherwise indicate a second source packed data 1012 having a second set of at least four data elements. The first and second source packed data may have the sizes, numbers of data elements, sizes of data elements, and types of data elements disclosed elsewhere herein.

In the illustrated embodiment, the values in each of the first source packed data and the second source packed data are sorted in order, although this is not required. In some embodiments, it may be assumed (e.g., implicitly assumed for the instruction) or required that the source data elements are in sorted order within the respective packed data. In the illustrated example, increasing order with increasing bit significance in the operands is used, although in another embodiment a decreasing order may optionally be used. In other embodiments, the data elements within each of the first source packed data and the second source packed data may not be assumed or required to be in sorted order within the respective packed data (e.g., the instruction may operate correctly when the elements are in an unsorted order).

A result packed data 1014 may be generated (e.g., by an execution unit 106) and stored in a destination storage location in response to the instruction. In some embodiments, the result packed data may include at least four indexes. In some embodiments, each index may point to, identify, or be associated with, a pair of corresponding data element positions in the first and second source packed data. The indexes themselves may not actually identify a single corresponding data element, but rather may identify a pair of corresponding data element positions in the first and second packed data, without indicating whether the actual corresponding data element is located in the first or second source packed data. For example, according to one possible convention, which is used in the illustrated example, index values of 0 through 7 may represent the eight data element positions when moving from least to most significant bit positions (right to left as viewed) across the first source packed data, and the same index values of 0 through 7 may represent the eight data element positions when moving from least to most significant bit positions across the second source packed data. For example, the data element with the value 43 and the data element with the value 24 may both have a same index of 6. As previously mentioned, various other conventions for the indexes may optionally be used instead (e.g., starting with an index of one instead of zero, a backwards or decrementing convention, an arbitrarily mapped convention, etc.) In such embodiments, the index alone may be insufficient to identify a single corresponding data element.

In some embodiments, the indexes may be stored in positions in the result packed data that are to represent a sorted order of the corresponding data elements. In the illustrated embodiment, the indexes are stored in positions in the result packed data that are to represent a sorted increasing order of the corresponding data elements. In other embodiments, a decreasing order may optionally be used. Moreover, in the illustrated embodiment, the indexes are stored for only an ordered smallest subset, for example a smallest half, of all of the data elements. Alternatively, another subset, such as a largest subset (e.g., a largest half), or an intermediate subset, may be used. Alternatively, indexes for all data elements in the source packed data may optionally be stored.

Referring again to FIG. 10, a result mask 1020 may be generated and stored in a second destination storage location in response to the instruction. The destination storage location may be specified or otherwise indicated by the instruction. In some embodiments, the second destination storage location may be a mask register (e.g., one of mask registers 118) Alternatively, the result mask may be stored in a general-purpose register, a memory location, or other storage location.

In some embodiments, the result mask may include at least four mask elements. In some embodiments, the result mask may include a same number of mask elements as a number of indexes in the result packed data. Each mask element may correspond to a different corresponding one of the indexes in the result packed data. Each mask element may indicate whether a single corresponding data element at the data element position indicated by the corresponding index is located in the first source packed data or instead is located in the second source packed data. That is, each mask element may identify or select one of the first and second source packed data, and thereby identify the corresponding single data element at the indexed position in the identified or selected source packed data.

In some embodiments, each mask element may be a single bit, although two or more bits may alternatively optionally be used (e.g., a most or least significant bit of a multi-bit data element). According to one possible convention, which is used in the illustrated example embodiment, a single bit being set to a binary value of one (i.e., 1) indicates that the data element is located in the first source packed data 1010, whereas the bit being cleared to a binary value of zero (i.e., 0) indicates that the data element is located in the second source packed data 1012. Alternatively, the opposite convention may optionally be used. To further illustrate, the data element with value −14 is identified by the corresponding index of 0 in the rightmost position of the result packed data and the mask element value of 0 in the rightmost position in the result mask (to indicate the second source packed data). Similarly, the data element with the value −4 is identified by the corresponding index of 0 in the third position from the right of the result packed data and the mask element value of 1 in the third position from the right of the result mask (to indicate the first source packed data).

In some embodiments, a convention may be adopted that if two inter-operand data elements in different source packed data have equal values, that elements from one of the source packed data may be interpreted as if it had a smaller value, although this is not required. In some embodiments, a convention may be adopted that if two intra-operand data elements in the same source packed data have equal values, the least significant data element may be interpreted as if it had a smaller value, although this is not required.

Including the extra packed data operand selection bits (e.g., the mask elements) in the result mask, instead of incorporating them into the indexes (as in the approach shown in FIGS. 6-9), may offer advantages in certain embodiments. For example, this may be the case when a processor is able to use the result mask as a predicate operand to mask or predicate a packed data operation. In some embodiments, the masking or predication may be at per-data element granularity such that operations on different pairs of corresponding data elements may be predicated or conditionally controlled separately and/or independently of others. The mask elements in the result mask may represent predicate elements or conditional control elements. In one aspect, the mask elements may be included in a one-to-one correspondence with corresponding source data elements and/or corresponding result data elements. By way of example, a value of each mask element or bit may control whether or not a corresponding operation is to be performed and/or a corresponding result data element is to be stored. Each mask element or bit may have a first value to allow the operation to be performed on the corresponding pair of source data elements and allow the corresponding result data element to be stored in the destination, or may have a second different value to not allow the operation to be performed on the corresponding pair of source data elements and/or not allow the corresponding result data element to be stored in the destination. According to one possible convention, a mask bit cleared to binary zero (i.e., 0) may represent a masked out operation, whereas a mask bit set to binary one (i.e., 1) may represent an unmasked operation.

In some embodiments, in addition to the instruction that generates the result mask, the instruction set may also include a second instruction that is able to indicate or access the result mask as a source predicate operand or conditional control operand that is used to predicate, conditionally control, or mask whether or not corresponding operations are to be performed and/or corresponding results are to be stored. One specific example of an instruction that may indicate the result mask as a source predicate operand in certain implementations is a VMOVDQA32 instruction, which is described in Intel® Architecture Instruction Set Extensions Programming Reference, 319433-017, published December 2013. The VMOVDQA32 instruction is able to move aligned packed doubleword integer values from a source packed data operand to a result packed data operand using a source writemask for predication. The result mask may be indicated by the VMOVDQA32 instruction as the source writemask. In some implementations and/or for some algorithms the result mask may be used by such predicated instructions to offer certain performance and/or efficiency advantages from an overall algorithmic perspective. In some embodiments, the result mask may be used even if the result packed data 1014 has enough bits that it could instead have integrated the extra bit into the indexes.

Figure 11:
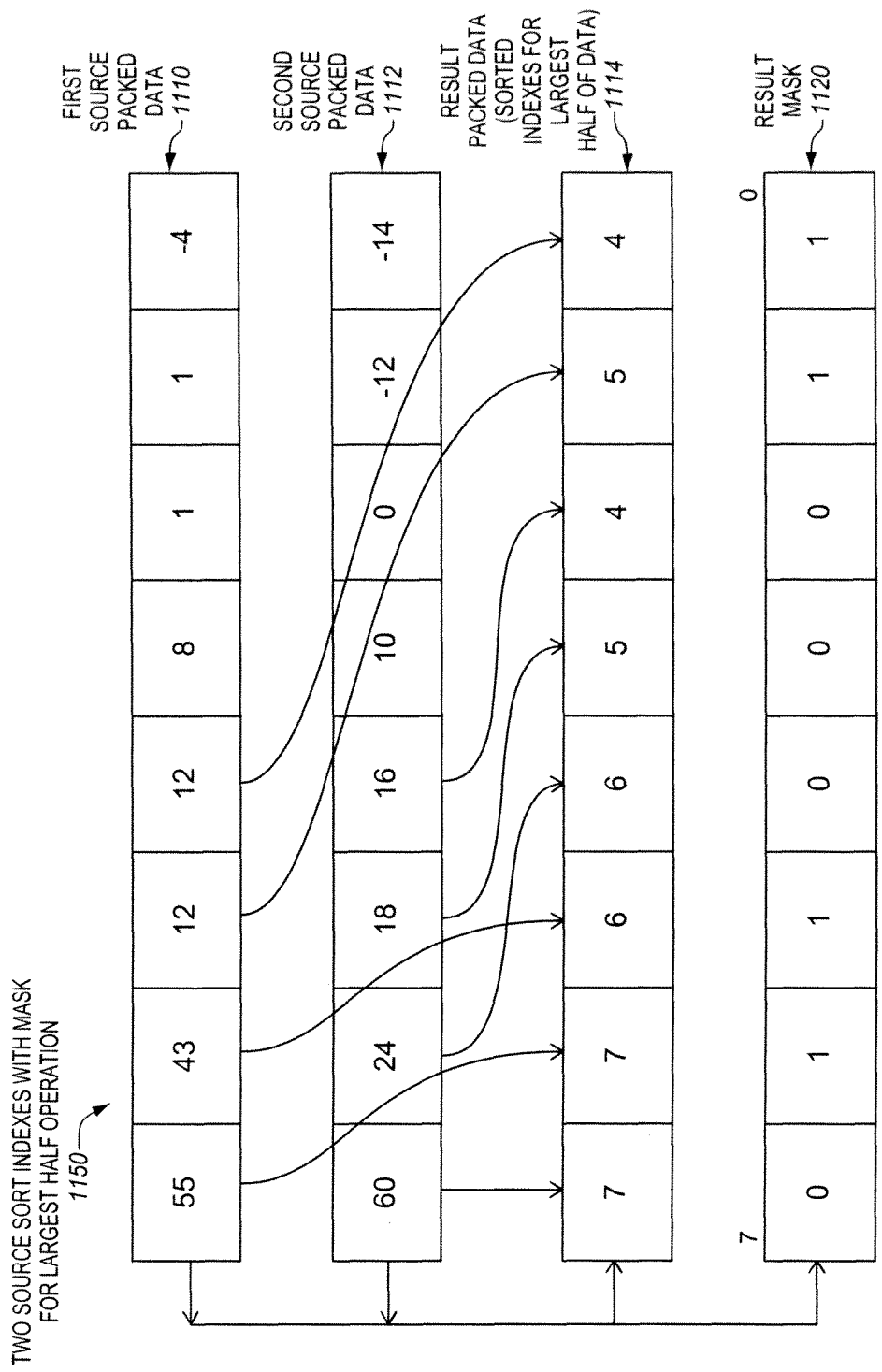
FIG. 11 is a block diagram of an embodiment of a two source sort indexes with mask for a largest half of data elements operation.

FIG. 11 is a block diagram illustrating an embodiment of a two source sort indexes with mask for a largest half of data elements operation 1150 that may be performed in response to an embodiment of a two source sort indexes with mask for a largest half of data elements instruction. The instruction may specify or otherwise indicate a first source packed data 1110 having a first set of at least four data elements, and may specify or otherwise indicate a second source packed data 1112 having a second set of at least four data elements. In the illustrated embodiment, the values in each of the first source packed data and the second source packed data are sorted in order, although this is not required. In some embodiments, it may be assumed (e.g., implicitly assumed for the instruction) or required that the source data elements are in sorted order within the respective packed data. In the illustrated example, increasing order with increasing bit significance in the operands is used, although in another embodiment a decreasing order may optionally be used. In other embodiments, the data elements within each of the first source packed data and the second source packed data may not be assumed or required to be in sorted order within the respective packed data (e.g., the instruction may operate correctly when the elements are in an unsorted order).

A result packed data 1114 may be generated (e.g., by an execution unit 106) and stored in a destination storage location in response to the instruction. In some embodiments, the result packed data may include at least four indexes. In some embodiments, each index may point to, identify, or be associated with, a pair of corresponding data element positions in the first and second source packed data. Likewise, a result mask 1120 may be stored in response to the instruction. The result mask may have mask elements corresponding to the indexes.

In the embodiment of FIG. 11, the indexes may correspond to an ordered largest subset, for example in the illustrated embodiment a largest half, of all of the data elements in the first and second source packed data. For example, the eight indexes may be stored in positions in the result packed data that are to represent a sorted order of the corresponding eight largest data elements in the first and second source packed data (e.g., 12, 12, 16, 18, 24, 43, 55, and 60). Likewise, the mask elements of the result mask may correspond to an ordered largest subset, for example in the illustrated embodiment a largest half, of all of the data elements in the first and second source packed data.

In the illustrated embodiment, the eight indexes are stored in positions in the result packed data that are to represent a sorted increasing order of the corresponding eight largest data elements in the first and second source packed data. In other embodiments, a decreasing or reverse order may optionally be used.

Figure 12:
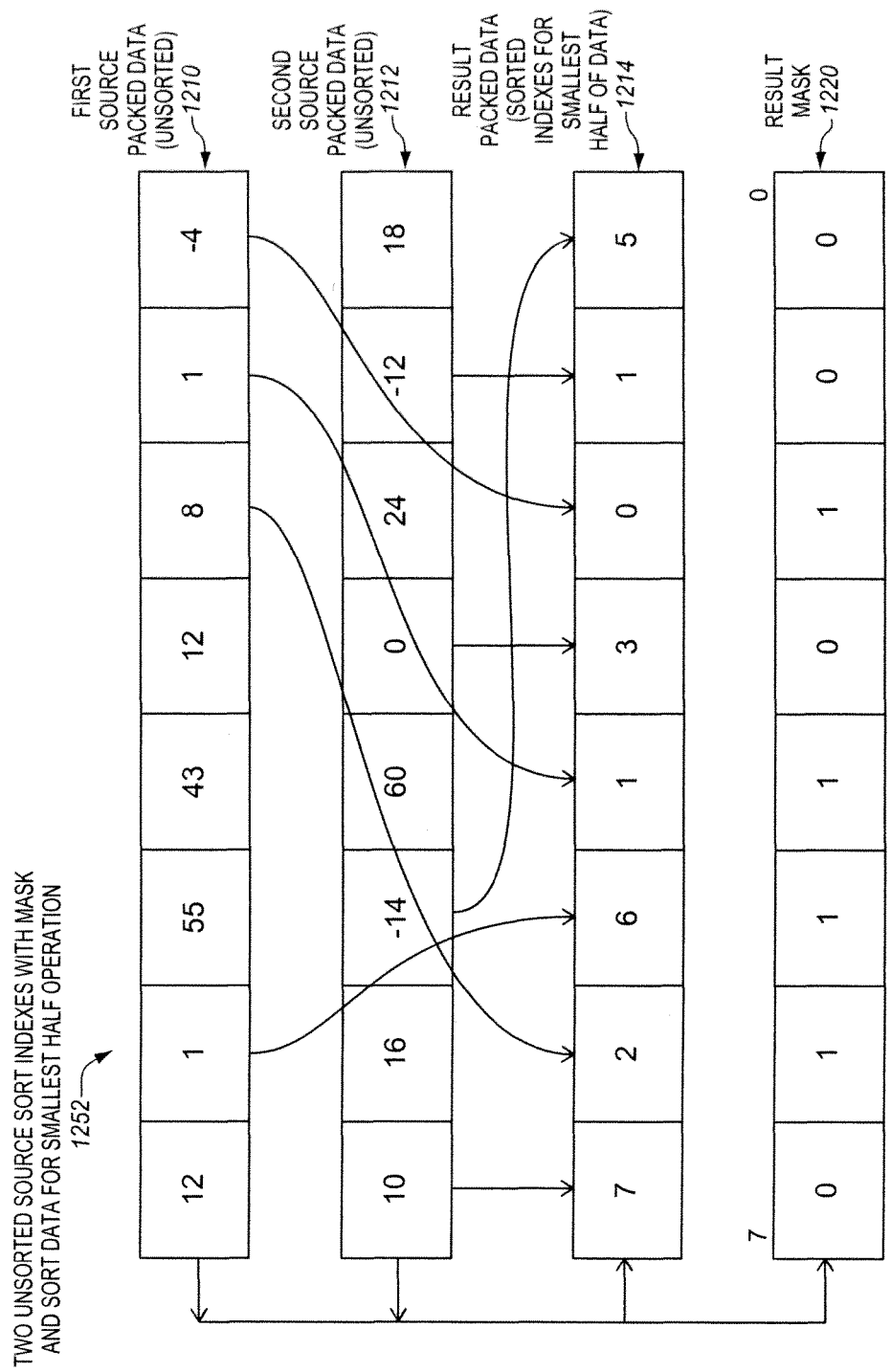
FIG. 12 is a block diagram of an embodiment of a two unsorted source sort indexes with mask for a smallest half of data elements operation.

FIG. 12 is a block diagram illustrating an embodiment of a two unsorted source sort indexes with mask for a smallest half of data elements operation 1252 that may be performed in response to an embodiment of a two unsorted source sort indexes with mask for a smallest half of data elements instruction. The instruction may specify or otherwise indicate a first source packed data 1210 having a first set of at least four data elements, and may specify or otherwise indicate a second source packed data 1212 having a second set of at least four data elements. In the operation of FIG. 12, the values of the data elements in the first source packed data operand are not in a sorted order. Similarly, the values of the data elements in the second source packed data operand are not in a sorted order. The data elements within each of the first source packed data and the second source packed data may not be assumed or required to be in sorted order within the respective packed data operand (e.g., the instruction may operate correctly when the elements are in an unsorted order in the source packed data operands).

A result packed data 1214 may be generated (e.g., by an execution unit 106) and stored in a destination storage location in response to the instruction. In some embodiments, the result packed data may include at least four indexes. In some embodiments, each index may point to, identify, or be associated with, a pair of corresponding data element positions in the first and second source packed data. Likewise, a result mask 1220 may be stored in response to the instruction. The result mask may have mask elements corresponding to the indexes.

In the illustrated embodiment, the indexes and mask elements correspond to a smallest subset, in this case a smallest half, of all data elements in the first and second source packed data. In another embodiment, the indexes and mask elements may corresponding to a largest subset, for example a largest half, of all data elements in the first and second source packed data.

In the illustrated embodiment, the eight indexes are stored in positions in the result packed data that are to represent a sorted increasing order of the corresponding eight largest data elements in the first and second source packed data. In other embodiments, a decreasing or reverse order may optionally be used.

Figure 13:
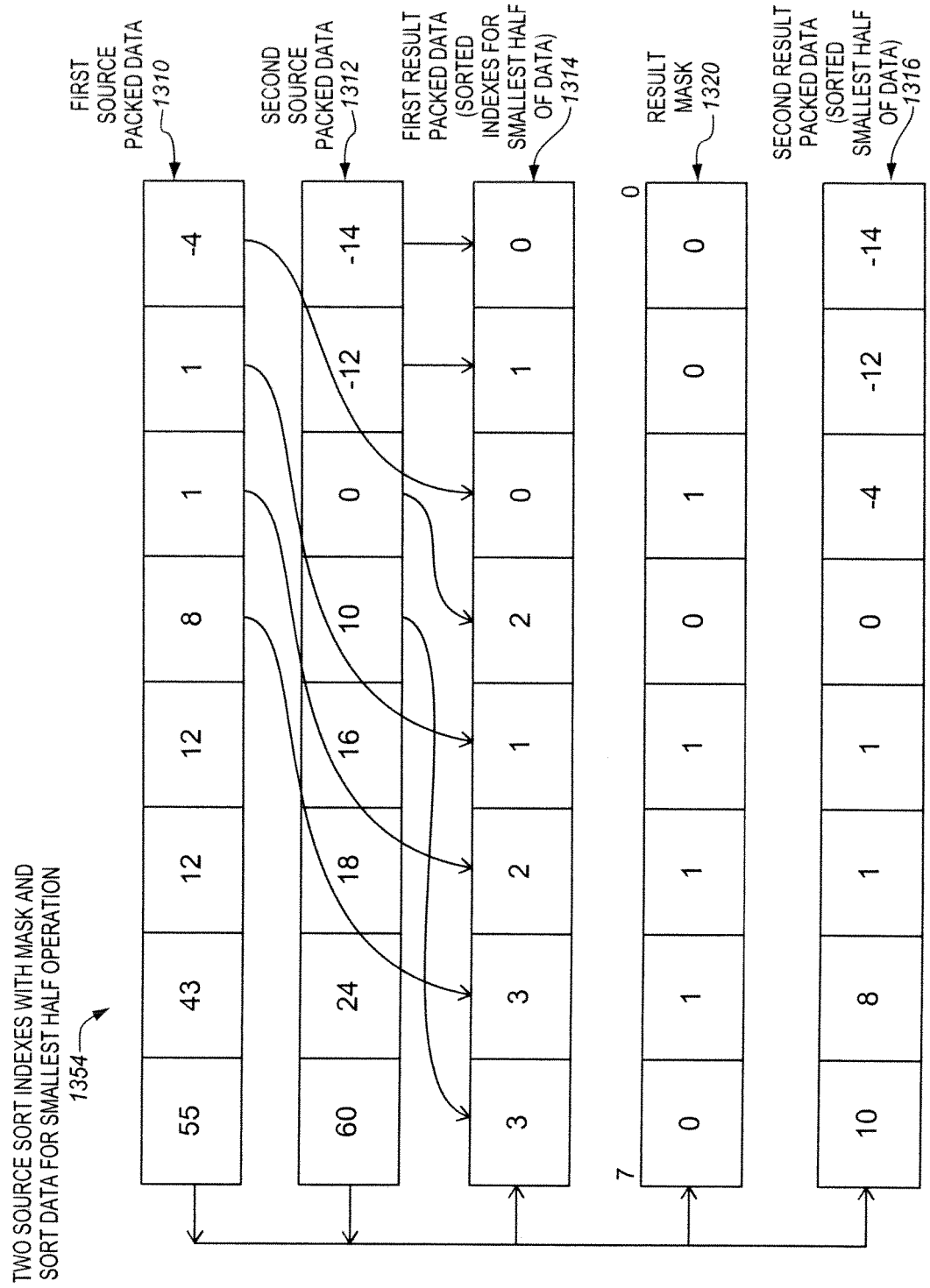
FIG. 13 is a block diagram of an embodiment of a two source sort indexes with mask and sort data for a smallest half of data elements operation.

FIG. 13 is a block diagram illustrating an embodiment of a two source sort indexes with mask and sort data for a smallest half of data elements operation 1354 that may be performed in response to an embodiment of a two source sort indexes with mask and sort data for a smallest half of data elements instruction. The instruction may specify or otherwise indicate a first source packed data 1310 having a first set of at least four data elements, and may specify or otherwise indicate a second source packed data 1312 having a second set of at least four data elements. In the illustrated embodiment, the values in each of the first source packed data and the second source packed data are sorted in order, although this is not required. In some embodiments, it may be assumed (e.g., implicitly assumed for the instruction) or required that the source data elements are in sorted order within the respective packed data. In the illustrated example, increasing order with increasing bit significance in the operands is used, although in another embodiment a decreasing order may optionally be used. In other embodiments, the data elements within each of the first source packed data and the second source packed data may not be assumed or required to be in sorted order within the respective packed data (e.g., the instruction may operate correctly when the elements are in an unsorted order).

A first result packed data 1314 may be generated (e.g., by an execution unit 106) and stored in a destination storage location in response to the instruction. In some embodiments, the result packed data may include at least four indexes. In some embodiments, each index may point to, identify, or be associated with, a pair of corresponding data element positions in the first and second source packed data. Likewise, a result mask 1320 may be stored in response to the instruction. The result mask may have mask elements corresponding to the indexes.

In this embodiment, a second result packed data 1316 may also be generated and stored in a second destination storage location in response to the instruction. The second destination storage location may be specified or otherwise indicated by the instruction, and may be a packed data register, a memory location, or other storage location. The second destination storage location may either be the same storage location used for one of the first or second source packed data, or may be a different storage location. The second result packed data may include the corresponding data elements, which correspond to the indexes stored and the mask elements, stored in positions of the second result packed data that reflect the sorted order.

In the illustrated embodiment, the sorted data elements, indexes, and mask elements correspond to a smallest subset, in this case a smallest half, of all data elements in the first and second source packed data. In another embodiment, the sorted data elements, indexes, and mask elements may correspond to a largest subset, for example a largest half, of all data elements in the first and second source packed data.

In the illustrated embodiment, the sorted data elements, indexes, and mask elements are stored in positions to represent an increasing order. In other embodiments, a decreasing or reverse order may optionally be used.

Sorted indexes are stored as a result in FIG. 10. Both sorted indexes and sorted data elements are stored as results in FIG. 13. In another embodiment, sort data elements, but not indexes, may optionally be stored responsive to an instruction The operations of FIGS. 11-13 have certain similarities to the operation of FIG. 10. To avoid obscuring the description, the different and/or additional characteristics for the operations of FIGS. 11-13 have primarily been described, without repeating all the optionally similar or common characteristics and details relative to the operation of FIG. 10. However, it is to be appreciated that the previously described characteristics and details of the operation of FIG. 10 may also optionally apply to the operations of any of FIGS. 11-13, unless stated otherwise or otherwise clearly apparent.

An instruction set may include one or more of the instructions disclosed herein. For example, in some embodiments, an instruction set may optionally include a first instruction (e.g., as shown or described for one of FIGS. 3-4) that is able to generate a sorted result and a second instruction that assumes or needs a sorted source packed data (e.g., as shown or described for one of FIGS. 6, 7, 9, 10, 11, and 13). As another example, in some embodiments, an instruction set may optionally include a first instruction for a sort for smallest half of all source data elements (e.g., as shown or described for one of FIGS. 6 and 10), and a second instruction for a sort for largest half of all data elements instruction (e.g., as shown or described for one of FIGS. 7 and 11). Alternatively, an instruction set may include only one of the instructions as shown and described herein.

The following code snippet represents an example embodiment of an algorithm using examples of instructions as disclosed herein to sort 32 integers. The sortassistd instruction sorts doubleword elements in assenting order with an operation similar to that shown in FIG. 3. The sortedmergedassist1 and sortedmergedassisth instructions are two source instructions that store sorted indexes for already sorted elements in first and second source packed data similar to the operations of FIGS. 10-11.

```
sort32:
    vmovdqu32 (%rdi), %zmm0
    vmovdqu32 64(%rdi), %zmm1
    sortassistd %zmm0, %zmm2
    sortassistd %zmm1, %zmm3
    vpermd %zmm0, %zmm2, %zmm0
    vpermd %zmm1, %zmm3, %zmm1
    sortedmergedassistl %zmm1, %zmm0, %zmm2, %k1
    sortedmergedassisth %zmm1, %zmm0, %zmm3, %k2
    vpermd %zmm0, %zmm2, %zmm4
    vpermd %zmm1, %zmm2, %zmm5
    vpermd %zmm0, %zmm3, %zmm6
    vpermd %zmm1, %zmm3, %zmm7
    vmovdqu32 %zmm5, %zmm4, {%k1}
    vmovdqu32 %zmm7, %zmm6, {%k2}
    vmovdqu32 %zmm4, {%rdi}
    vmovdqu32 %zmm6, 64{%rdi}
    ret
```

In some embodiments, an instruction format may include an operation code or opcode. The opcode may represent a plurality of bits or one or more fields that are operable to identify the instruction and/or the operation to be performed (e.g., a sort index operation). Depending upon the particular instruction, the instruction format may also optionally include one or more source and/or destination specifiers. By way of example, each of these specifiers may include bits or one or more fields to specify an address of a register, memory location, or other storage location. Alternatively, instead of such an explicit specifier, one or more sources and/or destinations may optionally be implicit to the instruction instead of being explicitly specified. In addition, it may optionally be implicit that a source is to be reused as a destination. In addition, the instruction format may optionally add additional fields, may overlap certain fields, etc. Fields need not include contiguous sequences of bits but rather may be composed of non-contiguous or separated bits. In some embodiments, the instruction format may follow a VEX or EVEX encoding or instruction format, although the scope of the invention is not so limited.

Figure 14:
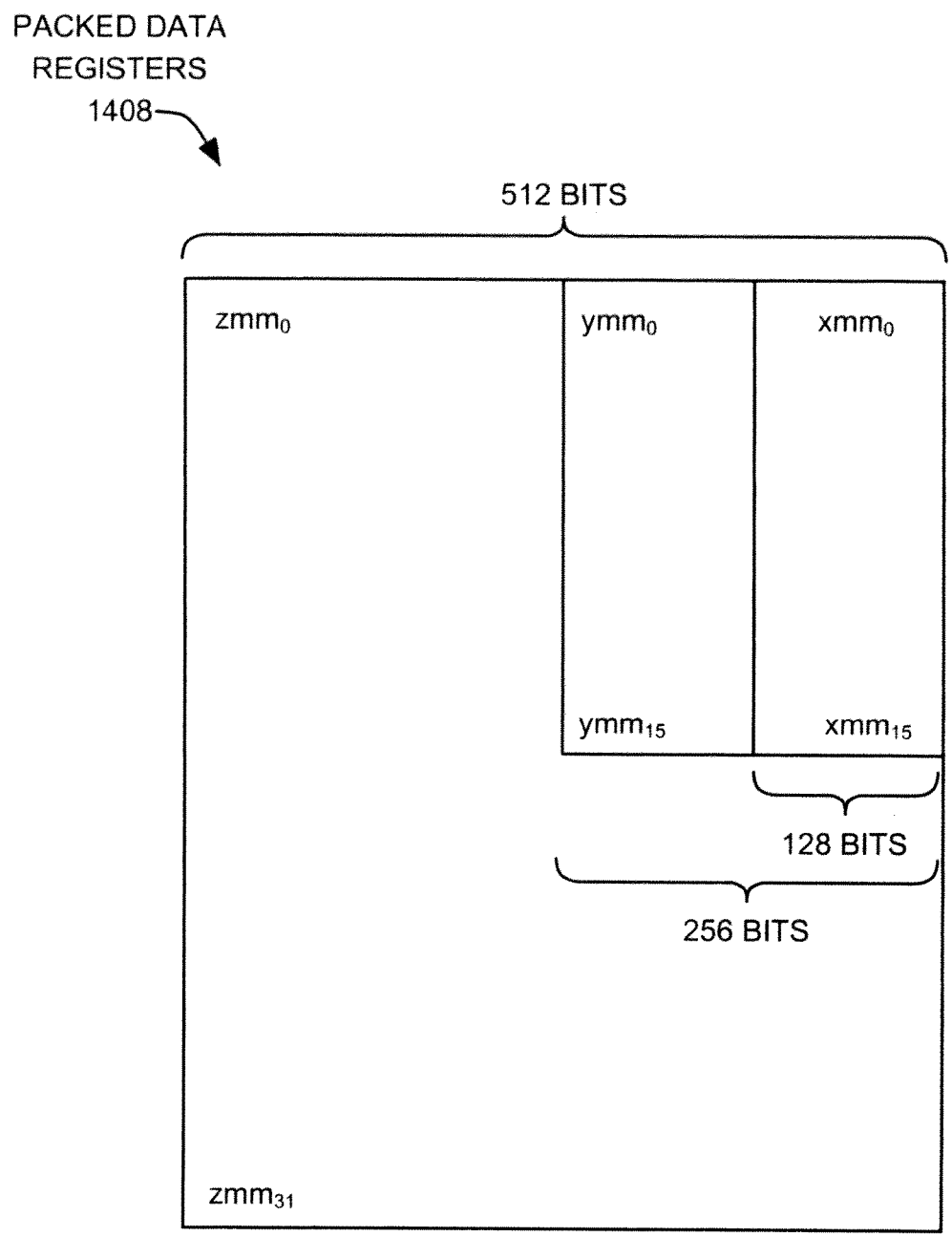
FIG. 14 is a block diagram of an embodiment of a suitable set of packed data registers.

FIG. 14 is a block diagram of an example embodiment of a suitable set of packed data registers 1408. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data or 128-bit packed data. The 128-bit registers XMM0-XMM15 are operable to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 15A:
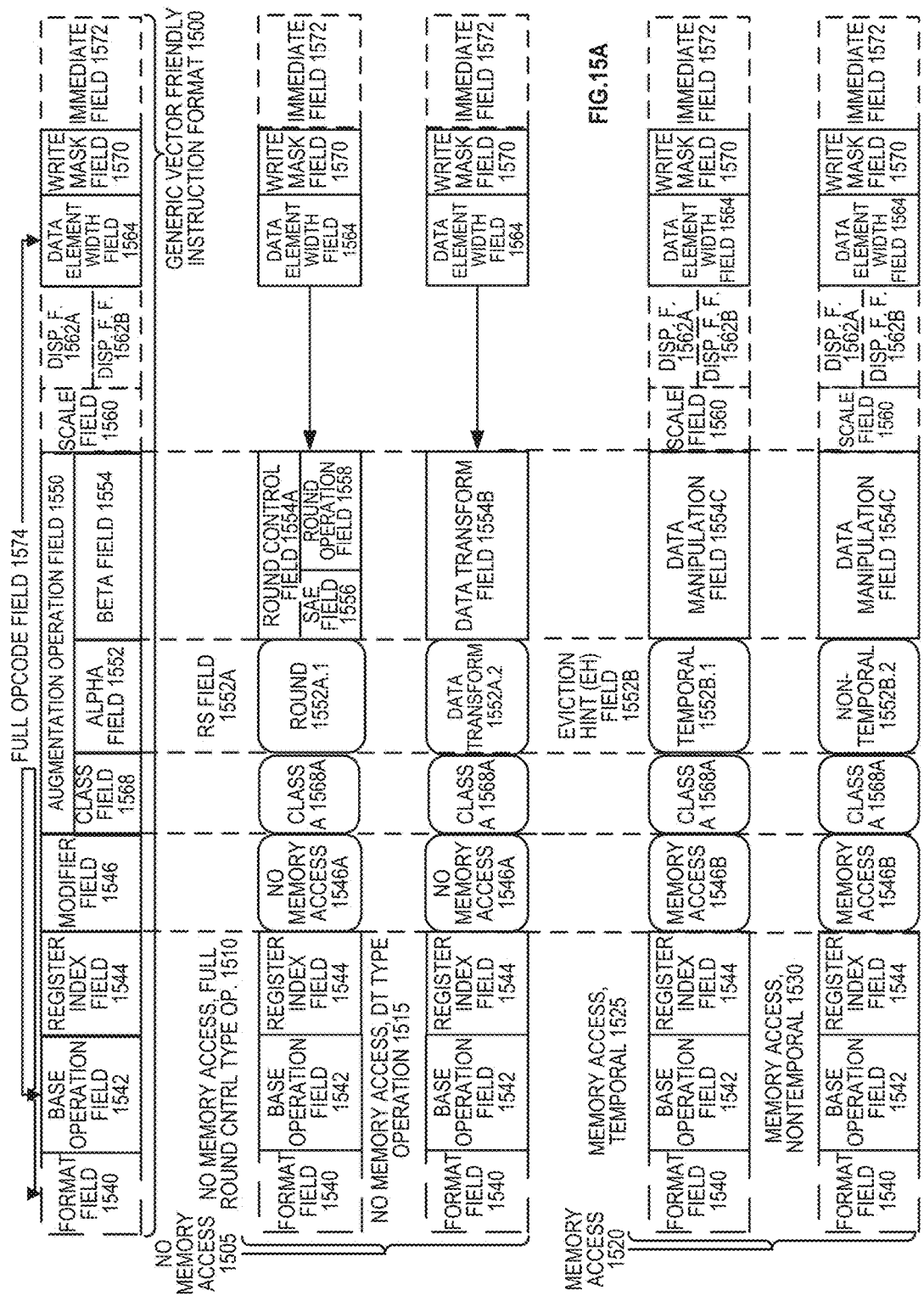
FIGS. 15A-15B are block diagrams illustrating a generic vector friendly instruction format and instruction templates thereof, according to embodiments of the invention.
Figure 15B:
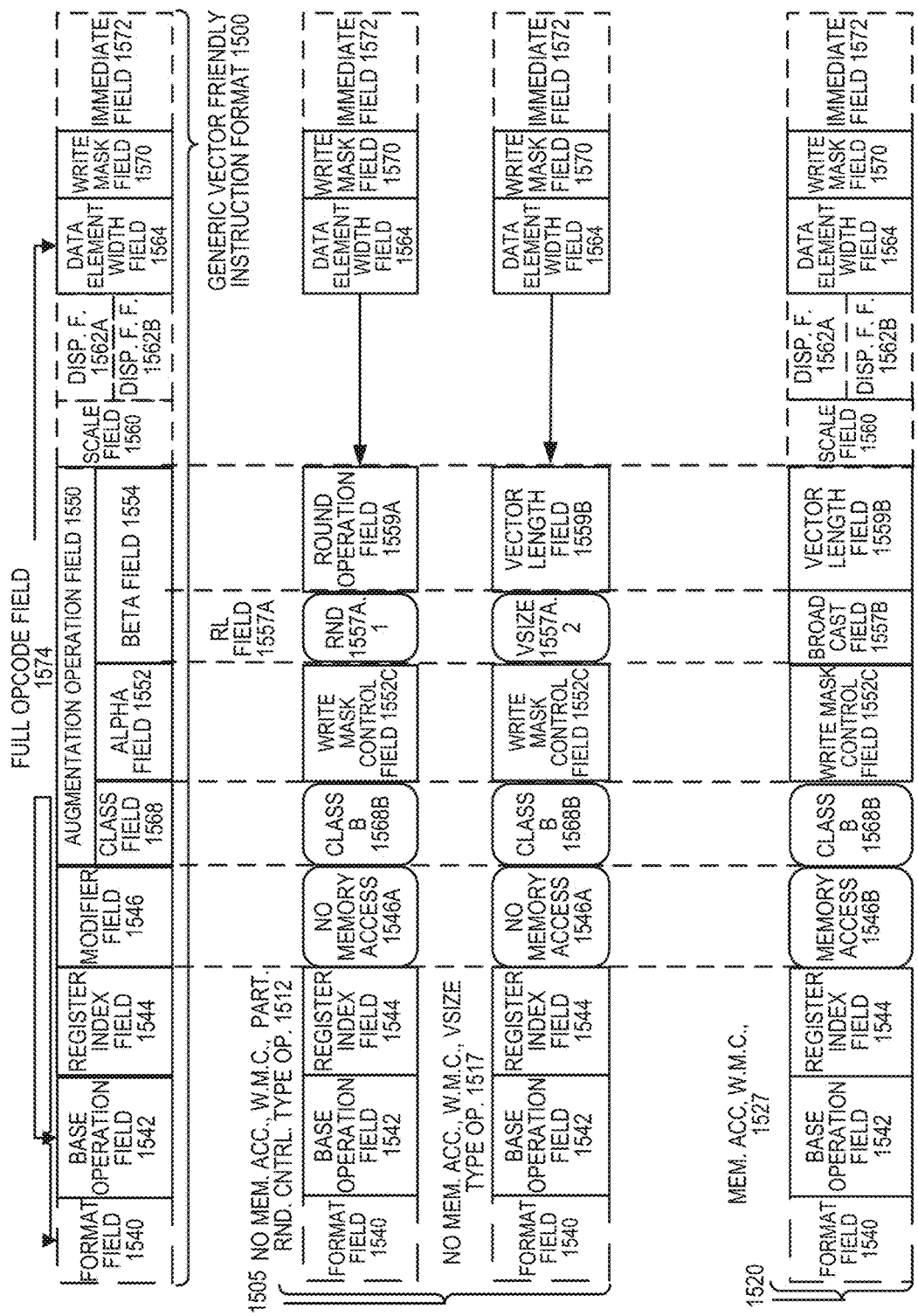

FIGS. 15A-15B are block diagrams illustrating a generic vector friendly instruction format and instruction templates thereof according to embodiments of the invention. FIG. 15A is a block diagram illustrating a generic vector friendly instruction format and class A instruction templates thereof according to embodiments of the invention; while FIG. 15B is a block diagram illustrating the generic vector friendly instruction format and class B instruction templates thereof according to embodiments of the invention. Specifically, a generic vector friendly instruction format 1500 for which are defined class A and class B instruction templates, both of which include no memory access 1505 instruction templates and memory access 1520 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 15A include: 1) within the no memory access 1505 instruction templates there is shown a no memory access, full round control type operation 1510 instruction template and a no memory access, data transform type operation 1515 instruction template; and 2) within the memory access 1520 instruction templates there is shown a memory access, temporal 1525 instruction template and a memory access, non-temporal 1530 instruction template. The class B instruction templates in FIG. 15B include: 1) within the no memory access 1505 instruction templates there is shown a no memory access, write mask control, partial round control type operation 1512 instruction template and a no memory access, write mask control, vsize type operation 1517 instruction template; and 2) within the memory access 1520 instruction templates there is shown a memory access, write mask control 1527 instruction template.

The generic vector friendly instruction format 1500 includes the following fields listed below in the order illustrated in FIGS. 15A-15B.

Format field 1540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1542—its content distinguishes different base operations.

Register index field 1544—its content, directly or through address generation, specifies the locations of the source and destination operands, be they in registers or in memory.

These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1546—its content distinguishes occurrences of instructions in the generic vector instruction format that specify memory access from those that do not; that is, between no memory access 1505 instruction templates and memory access 1520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1550—its content distinguishes which one of a variety of different operations to be performed in addition to the base operation. This field is context specific. In one embodiment of the invention, this field is divided into a class field 1568, an alpha field 1552, and a beta field 1554. The augmentation operation field 1550 allows common groups of operations to be performed in a single instruction rather than 2, 3, or 4 instructions.

Scale field 1560—its content allows for the scaling of the index field's content for memory address generation (e.g., for address generation that uses $2^{scale}*index+base$).

Displacement Field 1562A—its content is used as part of memory address generation (e.g., for address generation that uses $2^{scale}*index+base+displacement$).

Displacement Factor Field 1562B (note that the juxtaposition of displacement field 1562A directly over displacement factor field 1562B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1574 (described later herein) and the data manipulation field 1554C. The displacement field 1562A and the displacement factor field 1562B are optional in the sense that they are not used for the no memory access 1505 instruction templates and/or different embodiments may implement only one or none of the two.

Data element width field 1564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1570 allows for partial vector operations, including loads, stores, arithmetic, logical, etc. While embodiments of the invention are described in which the write mask field's 1570 content selects one of a number of write mask registers that contains the write mask to be used (and thus the write mask field's 1570 content indirectly identifies that masking to be performed), alternative embodiments instead or additional allow the mask write field's 1570 content to directly specify the masking to be performed.

Immediate field 1572—its content allows for the specification of an immediate. This field is optional in the sense that is it not present in an implementation of the generic vector friendly format that does not support immediate and it is not present in instructions that do not use an immediate.

Class field 1568—its content distinguishes between different classes of instructions. With reference to FIGS. 15A-B, the contents of this field select between class A and class B instructions. In FIGS. 15A-B, rounded corner squares are used to indicate a specific value is present in a field (e.g., class A 1568A and class B 1568B for the class field 1568 respectively in FIGS. 15A-B).

Instruction Templates of Class A

In the case of the non-memory access 1505 instruction templates of class A, the alpha field 1552 is interpreted as an RS field 1552A, whose content distinguishes which one of the different augmentation operation types are to be performed (e.g., round 1552A.1 and data transform 1552A.2 are respectively specified for the no memory access, round type operation 1510 and the no memory access, data transform type operation 1515 instruction templates), while the beta field 1554 distinguishes which of the operations of the specified type is to be performed. In the no memory access 1505 instruction templates, the scale field 1560, the displacement field 1562A, and the displacement scale filed 1562B are not present.

No-Memory Access Instruction Templates—Full Round Control Type Operation

In the no memory access full round control type operation 1510 instruction template, the beta field 1554 is interpreted as a round control field 1554A, whose content(s) provide static rounding. While in the described embodiments of the invention the round control field 1554A includes a suppress all floating point exceptions (SAE) field 1556 and a round operation control field 1558, alternative embodiments may support may encode both these concepts into the same field or only have one or the other of these concepts/fields (e.g., may have only the round operation control field 1558).

SAE field 1556—its content distinguishes whether or not to disable the exception event reporting; when the SAE field's 1556 content indicates suppression is enabled, a given instruction does not report any kind of floating-point exception flag and does not raise any floating point exception handler.

Round operation control field 1558—its content distinguishes which one of a group of rounding operations to perform (e.g., Round-up, Round-down, Round-towards-zero and Round-to-nearest). Thus, the round operation control field 1558 allows for the changing of the rounding mode on a per instruction basis. In one embodiment of the invention where a processor includes a control register for specifying rounding modes, the round operation control field's 1550 content overrides that register value.

No Memory Access Instruction Templates—Data Transform Type Operation

In the no memory access data transform type operation 1515 instruction template, the beta field 1554 is interpreted as a data transform field 1554B, whose content distinguishes which one of a number of data transforms is to be performed (e.g., no data transform, swizzle, broadcast).

In the case of a memory access 1520 instruction template of class A, the alpha field 1552 is interpreted as an eviction hint field 1552B, whose content distinguishes which one of the eviction hints is to be used (in FIG. 15A, temporal 1552B.1 and non-temporal 1552B.2 are respectively specified for the memory access, temporal 1525 instruction template and the memory access, non-temporal 1530 instruction template), while the beta field 1554 is interpreted as a data manipulation field 1554C, whose content distinguishes which one of a number of data manipulation operations (also known as primitives) is to be performed (e.g., no manipulation; broadcast; up conversion of a source; and down conversion of a destination). The memory access 1520 instruction templates include the scale field 1560, and optionally the displacement field 1562A or the displacement scale field 1562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1552 is interpreted as a write mask control (Z) field 1552C, whose content distinguishes whether the write masking controlled by the write mask field 1570 should be a merging or a zeroing.

In the case of the non-memory access 1505 instruction templates of class B, part of the beta field 1554 is interpreted as an RL field 1557A, whose content distinguishes which one of the different augmentation operation types are to be performed (e.g., round 1557A.1 and vector length (VSIZE) 1557A.2 are respectively specified for the no memory access, write mask control, partial round control type operation 1512 instruction template and the no memory access, write mask control, VSIZE type operation 1517 instruction template), while the rest of the beta field 1554 distinguishes which of the operations of the specified type is to be performed. In the no memory access 1505 instruction templates, the scale field 1560, the displacement field 1562A, and the displacement scale filed 1562B are not present.

In the no memory access, write mask control, partial round control type operation 1510 instruction template, the rest of the beta field 1554 is interpreted as a round operation field 1559A and exception event reporting is disabled (a given instruction does not report any kind of floating-point exception flag and does not raise any floating point exception handler).

Round operation control field 1559A—just as round operation control field 1558, its content distinguishes which one of a group of rounding operations to perform (e.g., Round-up, Round-down, Round-towards-zero and Round-to-nearest). Thus, the round operation control field 1559A allows for the changing of the rounding mode on a per instruction basis. In one embodiment of the invention where a processor includes a control register for specifying rounding modes, the round operation control field's 1550 content overrides that register value.

In the no memory access, write mask control, VSIZE type operation 1517 instruction template, the rest of the beta field 1554 is interpreted as a vector length field 1559B, whose content distinguishes which one of a number of data vector lengths is to be performed on (e.g., 128, 256, or 512 byte).

In the case of a memory access 1520 instruction template of class B, part of the beta field 1554 is interpreted as a broadcast field 1557B, whose content distinguishes whether or not the broadcast type data manipulation operation is to be performed, while the rest of the beta field 1554 is interpreted the vector length field 1559B. The memory access 1520 instruction templates include the scale field 1560, and optionally the displacement field 1562A or the displacement scale field 1562B.

With regard to the generic vector friendly instruction format 1500, a full opcode field 1574 is shown including the format field 1540, the base operation field 1542, and the data element width field 1564. While one embodiment is shown where the full opcode field 1574 includes all of these fields, the full opcode field 1574 includes less than all of these fields in embodiments that do not support all of them. The full opcode field 1574 provides the operation code (opcode).

The augmentation operation field 1550, the data element width field 1564, and the write mask field 1570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 16 is a block diagram illustrating an exemplary specific vector friendly instruction format according to embodiments of the invention. FIG. 16 shows a specific vector friendly instruction format 1600 that is specific in the sense that it specifies the location, size, interpretation, and order of the fields, as well as values for some of those fields. The specific vector friendly instruction format 1600 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIG. 15 into which the fields from FIG. 16 map are illustrated.

It should be understood that, although embodiments of the invention are described with reference to the specific vector friendly instruction format 1600 in the context of the generic vector friendly instruction format 1500 for illustrative purposes, the invention is not limited to the specific vector friendly instruction format 1600 except where claimed. For example, the generic vector friendly instruction format 1500 contemplates a variety of possible sizes for the various fields, while the specific vector friendly instruction format 1600 is shown as having fields of specific sizes. By way of specific example, while the data element width field 1564 is illustrated as a one bit field in the specific vector friendly instruction format 1600, the invention is not so limited (that is, the generic vector friendly instruction format 1500 contemplates other sizes of the data element width field 1564).

The generic vector friendly instruction format 1500 includes the following fields listed below in the order illustrated in FIG. 16A.

EVEX Prefix (Bytes 0-3) 1602—is encoded in a four-byte form.

Format Field 1540 (EVEX Byte 0, bits [7:0])—the first byte (EVEX Byte 0) is the format field 1540 and it contains 0x62 (the unique value used for distinguishing the vector friendly instruction format in one embodiment of the invention).

The second-fourth bytes (EVEX Bytes 1-3) include a number of bit fields providing specific capability.

REX field 1605 (EVEX Byte 1, bits [7-5])—consists of a EVEX.R bit field (EVEX Byte 1, bit [7]—R), EVEX.X bit field (EVEX byte 1, bit [6]—X), and 1557BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1510—this is the first part of the REX' field 1510 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1615 (EVEX byte 1, bits [3:0]—mmmm)—its content encodes an implied leading opcode byte (0F, 0F 38, or 0F 3).

Data element width field 1564 (EVEX byte 2, bit [7]—W)—is represented by the notation EVEX.W. EVEX.W is used to define the granularity (size) of the datatype (either 32-bit data elements or 64-bit data elements).

EVEX.vvvv 1620 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1620 encodes the 4 low-order bits of the first source register specifier stored in inverted (1s complement) form. Depending on the instruction, an extra different EVEX bit field is used to extend the specifier size to 32 registers.

EVEX.U 1568 Class field (EVEX byte 2, bit [2]—U)—If EVEX.U=0, it indicates class A or EVEX.U0; if EVEX.U=1, it indicates class B or EVEX.U1.

Prefix encoding field 1625 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1552 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1554 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1510—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1570 (EVEX byte 3, bits [2:0]—kkk)— its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1630 (Byte 4) is also known as the opcode byte. Part of the opcode is specified in this field.

MOD R/M Field 1640 (Byte 5) includes MOD field 1642, Reg field 1644, and R/M field 1646. As previously described, the MOD field's 1642 content distinguishes between memory access and non-memory access operations. The role of Reg field 1644 can be summarized to two situations: encoding either the destination register operand or a source register operand, or be treated as an opcode extension and not used to encode any instruction operand. The role of R/M field 1646 may include the following: encoding the instruction operand that references a memory address, or encoding either the destination register operand or a source register operand.

Scale, Index, Base (SIB) Byte (Byte 6)— As previously described, the scale field's 1550 content is used for memory address generation. SIB.xxx 1654 and SIB.bbb 1656—the contents of these fields have been previously referred to with regard to the register indexes Xxxx and Bbbb.

Displacement field 1562A (Bytes 7-10)—when MOD field 1642 contains 10, bytes 7-10 are the displacement field 1562A, and it works the same as the legacy 32-bit displacement (disp32) and works at byte granularity.

Displacement factor field 1562B (Byte 7)—when MOD field 1642 contains 01, byte 7 is the displacement factor field 1562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1562B is a reinterpretation of disp8; when using displacement factor field 1562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1562B substitutes the legacy x86 instruction set 8-bit displacement. Thus, the displacement factor field 1562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1572 operates as previously described.

Full Opcode Field

FIG. 16B is a block diagram illustrating the fields of the specific vector friendly instruction format 1600 that make up the full opcode field 1574 according to one embodiment of the invention. Specifically, the full opcode field 1574 includes the format field 1540, the base operation field 1542, and the data element width (W) field 1564. The base operation field 1542 includes the prefix encoding field 1625, the opcode map field 1615, and the real opcode field 1630.

Register Index Field

FIG. 16C is a block diagram illustrating the fields of the specific vector friendly instruction format 1600 that make up the register index field 1544 according to one embodiment of the invention. Specifically, the register index field 1544 includes the REX field 1605, the REX' field 1610, the MODR/M.reg field 1644, the MODR/M.r/m field 1646, the VVVV field 1620, xxx field 1654, and the bbb field 1656.

Augmentation Operation Field

Figure 16D:
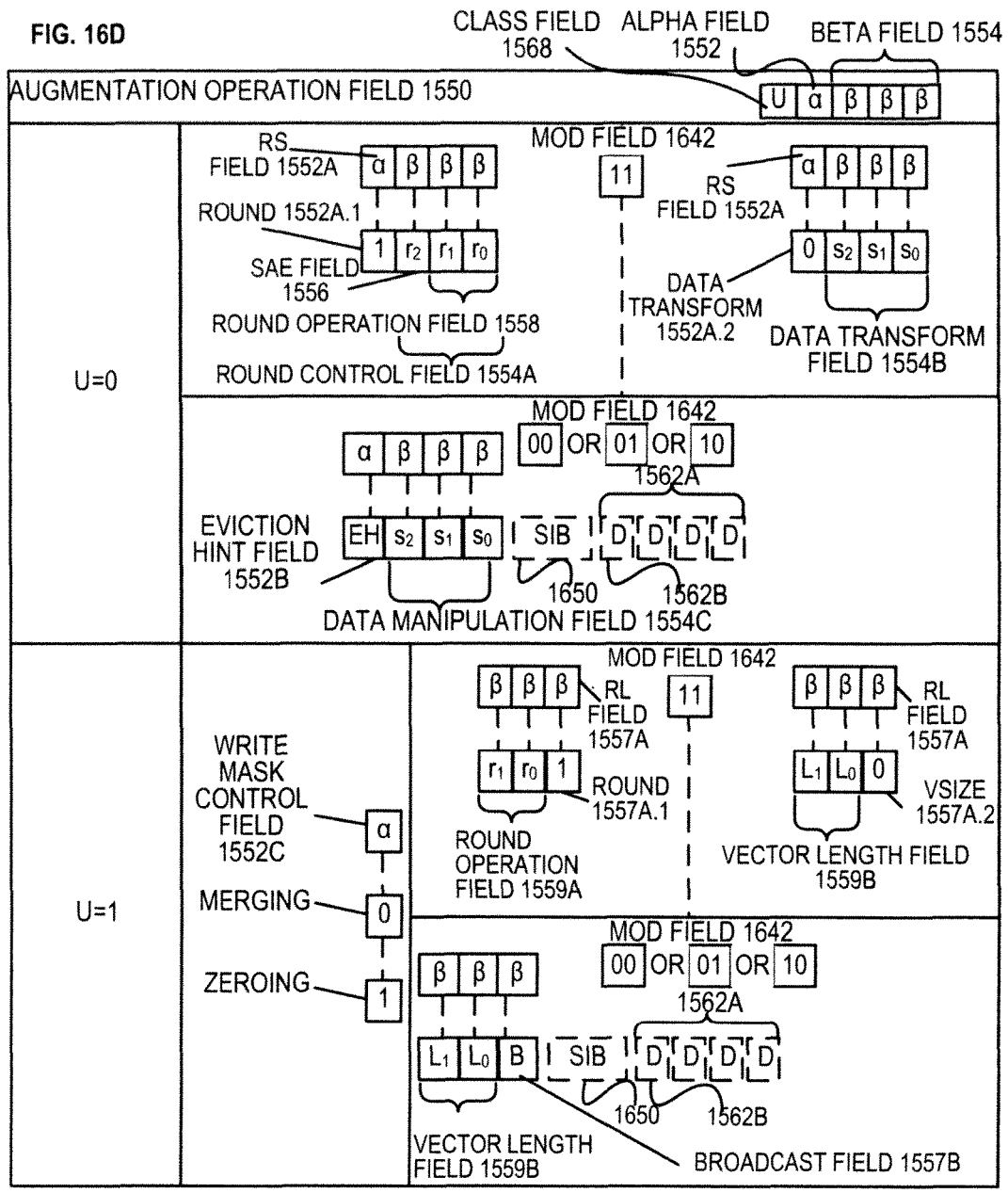
FIG. 16D is a block diagram illustrating fields of a specific vector friendly instruction format that make up an augmentation operation field, according to one embodiment of the invention.

FIG. 16D is a block diagram illustrating the fields of the specific vector friendly instruction format 1600 that make up the augmentation operation field 1550 according to one embodiment of the invention. When the class (U) field 1568 contains 0, it signifies EVEX.U0 (class A 1568A); when it contains 1, it signifies EVEX.U1 (class B 1568B). When U=0 and the MOD field 1642 contains 11 (signifying a no memory access operation), the alpha field 1552 (EVEX byte 3, bit [7]—EH) is interpreted as the rs field 1552A. When the rs field 1552A contains a 1 (round 1552A.1), the beta field 1554 (EVEX byte 3, bits [6:4]—SSS) is interpreted as the round control field 1554A. The round control field 1554A includes a one bit SAE field 1556 and a two bit round operation field 1558. When the rs field 1552A contains a 0 (data transform 1552A.2), the beta field 1554 (EVEX byte 3, bits [6:4]—SSS) is interpreted as a three bit data transform field 1554B. When U=0 and the MOD field 1642 contains 00, 01, or 10 (signifying a memory access operation), the alpha field 1552 (EVEX byte 3, bit [7]—EH) is interpreted as the eviction hint (EH) field 1552B and the beta field 1554 (EVEX byte 3, bits [6:4]—SSS) is interpreted as a three bit data manipulation field 1554C.

When U=1, the alpha field 1552 (EVEX byte 3, bit [7]—EH) is interpreted as the write mask control (Z) field 1552C. When U=1 and the MOD field 1642 contains 11 (signifying a no memory access operation), part of the beta field 1554 (EVEX byte 3, bit [4]—$S_0$) is interpreted as the RL field 1557A; when it contains a 1 (round 1557A.1) the rest of the beta field 1554 (EVEX byte 3, bit [6-5]—$S_{2-1}$) is interpreted as the round operation field 1559A, while when the RL field 1557A contains a 0 (VSIZE 1557.A2) the rest of the beta field 1554 (EVEX byte 3, bit [6-5]—$S_{2-1}$) is interpreted as the vector length field 1559B (EVEX byte 3, bit [6-5]—L$_{1-0}$). When U=1 and the MOD field 1642 contains 00, 01, or 10 (signifying a memory access operation), the beta field 1554 (EVEX byte 3, bits [6:4]—SSS) is interpreted as the vector length field 1559B (EVEX byte 3, bit [6-5]—L$_{1-0}$) and the broadcast field 1557B (EVEX byte 3, bit [4]—B).

Exemplary Register Architecture

FIG. 17 is a block diagram of a register architecture 1700 according to one embodiment of the invention. In the embodiment illustrated, there are 32 vector registers 1710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1600 operates on these overlaid register file as illustrated in the below tables.

| Adjustable Vector Length | Class | Operations | Registers |
|---|---|---|---|
| Instruction Templates that do not include the vector length field 1559B | A (FIG. 15A; U = 0) | 1510, 1515, 1525, 1530 | zmm registers (the vector length is 64 byte) |
| | B (FIG. 15B; U = 1) | 1512 | zmm registers (the vector length is 64 byte) |
| Instruction templates that do include the vector length field 1559B | B (FIG. 15B; U = 1) | 1517, 1527 | zmm, ymm, or xmm registers (the vector length is 64 byte, 32 byte, or 16 byte) depending on the vector length field 1559B |

In other words, the vector length field 1559B selects between a maximum length and one or more other shorter lengths, where each such shorter length is half the length of the preceding length; and instructions templates without the vector length field 1559B operate on the maximum vector length. Further, in one embodiment, the class B instruction templates of the specific vector friendly instruction format 1600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1715—in the embodiment illustrated, there are 8 write mask registers (k0 through k7), each 64 bits in size. In an alternate embodiment, the write mask registers 1715 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1745, on which is aliased the MMX packed integer flat register file 1750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order Core Block Diagram

FIG. 18A is a block diagram illustrating both an exemplary in-order pipeline and an exemplary register renaming, out-of-order issue/execution pipeline according to embodiments of the invention. FIG. 18B is a block diagram illustrating both an exemplary embodiment of an in-order architecture core and an exemplary register renaming, out-of-order issue/execution architecture core to be included in a processor according to embodiments of the invention. The solid lined boxes in FIGS. 18A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18A, a processor pipeline 1800 includes a fetch stage 1802, a length decode stage 1804, a decode stage 1806, an allocation stage 1808, a renaming stage 1810, a scheduling (also known as a dispatch or issue) stage 1812, a register read/memory read stage 1814, an execute stage 1816, a write back/memory write stage 1818, an exception handling stage 1822, and a commit stage 1824.

FIG. 18B shows processor core 1890 including a front end unit 1830 coupled to an execution engine unit 1850, and both are coupled to a memory unit 1870. The core 1890 may be a reduced instruction set computing (RISC) core, a complex instruction set computing (CISC) core, a very long instruction word (VLIW) core, or a hybrid or alternative core type. As yet another option, the core 1890 may be a special-purpose core, such as, for example, a network or communication core, compression engine, coprocessor core, general purpose computing graphics processing unit (GPGPU) core, graphics core, or the like.

The front end unit 1830 includes a branch prediction unit 1832 coupled to an instruction cache unit 1834, which is coupled to an instruction translation lookaside buffer (TLB) 1836, which is coupled to an instruction fetch unit 1838, which is coupled to a decode unit 1840. The decode unit 1840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1890 includes a microcode ROM or other medium that stores microcode for certain macroinstructions (e.g., in decode unit 1840 or otherwise within the front end unit 1830). The decode unit 1840 is coupled to a rename/allocator unit 1852 in the execution engine unit 1850.

The execution engine unit 1850 includes the rename/allocator unit 1852 coupled to a retirement unit 1854 and a set of one or more scheduler unit(s) 1856. The scheduler unit(s) 1856 represents any number of different schedulers, including reservations stations, central instruction window, etc. The scheduler unit(s) 1856 is coupled to the physical register file(s) unit(s) 1858. Each of the physical register file(s) units 1858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1858 comprises a vector registers unit, a write mask registers unit, and a scalar registers unit. These register units may provide architectural vector registers, vector mask registers, and general purpose registers. The physical register file(s) unit(s) 1858 is overlapped by the retirement unit 1854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1854 and the physical register file(s) unit(s) 1858 are coupled to the execution cluster(s) 1860. The execution cluster(s) 1860 includes a set of one or more execution units 1862 and a set of one or more memory access units 1864. The execution units 1862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1856, physical register file(s) unit(s) 1858, and execution cluster(s) 1860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1864). It should also be understood that where separate pipelines are used, one or more of these pipelines may be out-of-order issue/execution and the rest in-order.

The set of memory access units 1864 is coupled to the memory unit 1870, which includes a data TLB unit 1872 coupled to a data cache unit 1874 coupled to a level 2 (L2) cache unit 1876. In one exemplary embodiment, the memory access units 1864 may include a load unit, a store address unit, and a store data unit, each of which is coupled to the data TLB unit 1872 in the memory unit 1870. The instruction cache unit 1834 is further coupled to a level 2 (L2) cache unit 1876 in the memory unit 1870. The L2 cache unit 1876 is coupled to one or more other levels of cache and eventually to a main memory.

By way of example, the exemplary register renaming, out-of-order issue/execution core architecture may implement the pipeline 1800 as follows: 1) the instruction fetch 1838 performs the fetch and length decoding stages 1802 and 1804; 2) the decode unit 1840 performs the decode stage 1806; 3) the rename/allocator unit 1852 performs the allocation stage 1808 and renaming stage 1810; 4) the scheduler unit(s) 1856 performs the schedule stage 1812; 5) the physical register file(s) unit(s) 1858 and the memory unit 1870 perform the register read/memory read stage 1814; the execution cluster 1860 perform the execute stage 1816; 6) the memory unit 1870 and the physical register file(s) unit(s) 1858 perform the write back/memory write stage 1818; 7) various units may be involved in the exception handling stage 1822; and 8) the retirement unit 1854 and the physical register file(s) unit(s) 1858 perform the commit stage 1824.

The core 1890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1834/1874 and a shared L2 cache unit 1876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 19B:
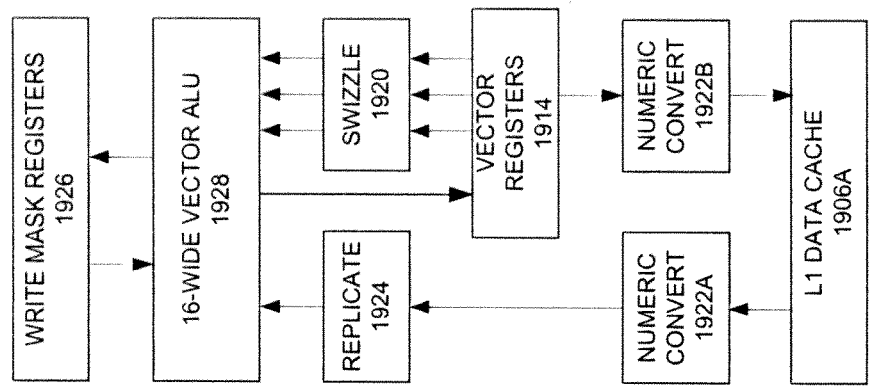
FIG. 19B is a block diagram of an embodiment of an expanded view of part of the processor core of FIG. 19A.
Figure 19A:
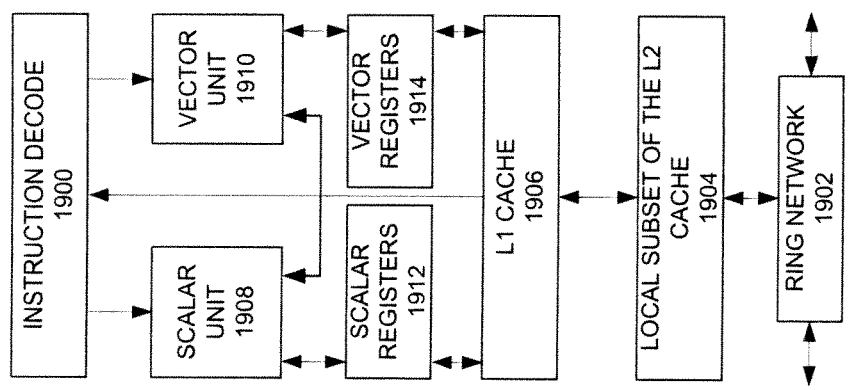
FIG. 19A is a block diagram of an embodiment of a single processor core, along with its connection to the on-die interconnect network, and with its local subset of the Level 2 (L2) cache.

FIGS. 19A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 19A is a block diagram of a single processor core, along with its connection to the on-die interconnect network 1902 and with its local subset of the Level 2 (L2) cache 1904, according to embodiments of the invention. In one embodiment, an instruction decoder 1900 supports the x86 instruction set with a packed data instruction set extension. An L1 cache 1906 allows low-latency accesses to cache memory into the scalar and vector units. While in one embodiment (to simplify the design), a scalar unit 1908 and a vector unit 1910 use separate register sets (respectively, scalar registers 1912 and vector registers 1914) and data transferred between them is written to memory and then read back in from a level 1 (L1) cache 1906, alternative embodiments of the invention may use a different approach (e.g., use a single register set or include a communication path that allow data to be transferred between the two register files without being written and read back).

The local subset of the L2 cache 1904 is part of a global L2 cache that is divided into separate local subsets, one per processor core. Each processor core has a direct access path to its own local subset of the L2 cache 1904. Data read by a processor core is stored in its L2 cache subset 1904 and can be accessed quickly, in parallel with other processor cores accessing their own local L2 cache subsets. Data written by a processor core is stored in its own L2 cache subset 1904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 19B is an expanded view of part of the processor core in FIG. 19A according to embodiments of the invention. FIG. 19B includes an L1 data cache 1906A part of the L1 cache 1904, as well as more detail regarding the vector unit 1910 and the vector registers 1914. Specifically, the vector unit 1910 is a 16-wide vector processing unit (VPU) (see the 16-wide ALU 1928), which executes one or more of integer, single-precision float, and double-precision float instructions. The VPU supports swizzling the register inputs with swizzle unit 1920, numeric conversion with numeric convert units 1922A-B, and replication with replication unit 1924 on the memory input. Write mask registers 1926 allow predicating resulting vector writes.

Processor with Integrated Memory Controller and Graphics

Figure 20:
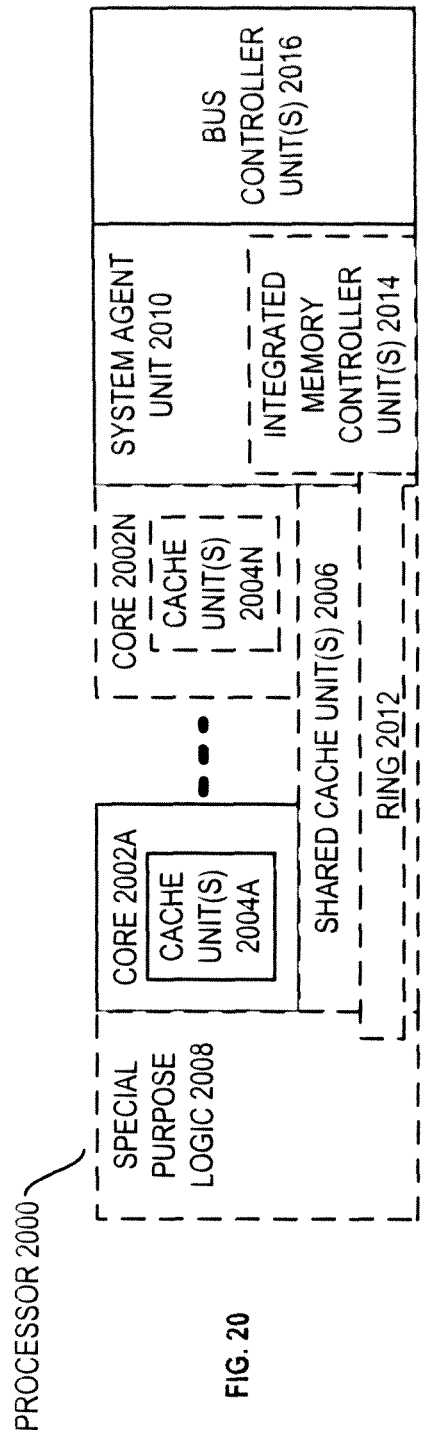
FIG. 20 is a block diagram of an embodiment of a processor that may have more than one core, may have an integrated memory controller, and may have integrated graphics.

FIG. 20 is a block diagram of a processor 2000 that may have more than one core, may have an integrated memory controller, and may have integrated graphics according to embodiments of the invention. The solid lined boxes in FIG. 20 illustrate a processor 2000 with a single core 2002A, a system agent 2010, a set of one or more bus controller units 2016, while the optional addition of the dashed lined boxes illustrates an alternative processor 2000 with multiple cores 2002A-N, a set of one or more integrated memory controller unit(s) 2014 in the system agent unit 2010, and special purpose logic 2008.

Thus, different implementations of the processor 2000 may include: 1) a CPU with the special purpose logic 2008 being integrated graphics and/or scientific (throughput) logic (which may include one or more cores), and the cores 2002A-N being one or more general purpose cores (e.g., general purpose in-order cores, general purpose out-of-order cores, a combination of the two); 2) a coprocessor with the cores 2002A-N being a large number of special purpose cores intended primarily for graphics and/or scientific (throughput); and 3) a coprocessor with the cores 2002A-N being a large number of general purpose in-order cores. Thus, the processor 2000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2006, and external memory (not shown) coupled to the set of integrated memory controller units 2014. The set of shared cache units 2006 may include one or more mid-level caches, such as level 2 (L2), level 3 (L3), level 4 (L4), or other levels of cache, a last level cache (LLC), and/or combinations thereof. While in one embodiment a ring based interconnect unit 2012 interconnects the integrated graphics logic 2008, the set of shared cache units 2006, and the system agent unit 2010/integrated memory controller unit(s) 2014, alternative embodiments may use any number of well-known techniques for interconnecting such units. In one embodiment, coherency is maintained between one or more cache units 2006 and cores 2002-A-N.

In some embodiments, one or more of the cores 2002A-N are capable of multi-threading. The system agent 2010 includes those components coordinating and operating cores 2002A-N. The system agent unit 2010 may include for example a power control unit (PCU) and a display unit. The PCU may be or include logic and components needed for regulating the power state of the cores 2002A-N and the integrated graphics logic 2008. The display unit is for driving one or more externally connected displays.

The cores 2002A-N may be homogenous or heterogeneous in terms of architecture instruction set; that is, two or more of the cores 2002A-N may be capable of execution the same instruction set, while others may be capable of executing only a subset of that instruction set or a different instruction set.

Exemplary Computer Architectures

FIGS. 21-24 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 21:
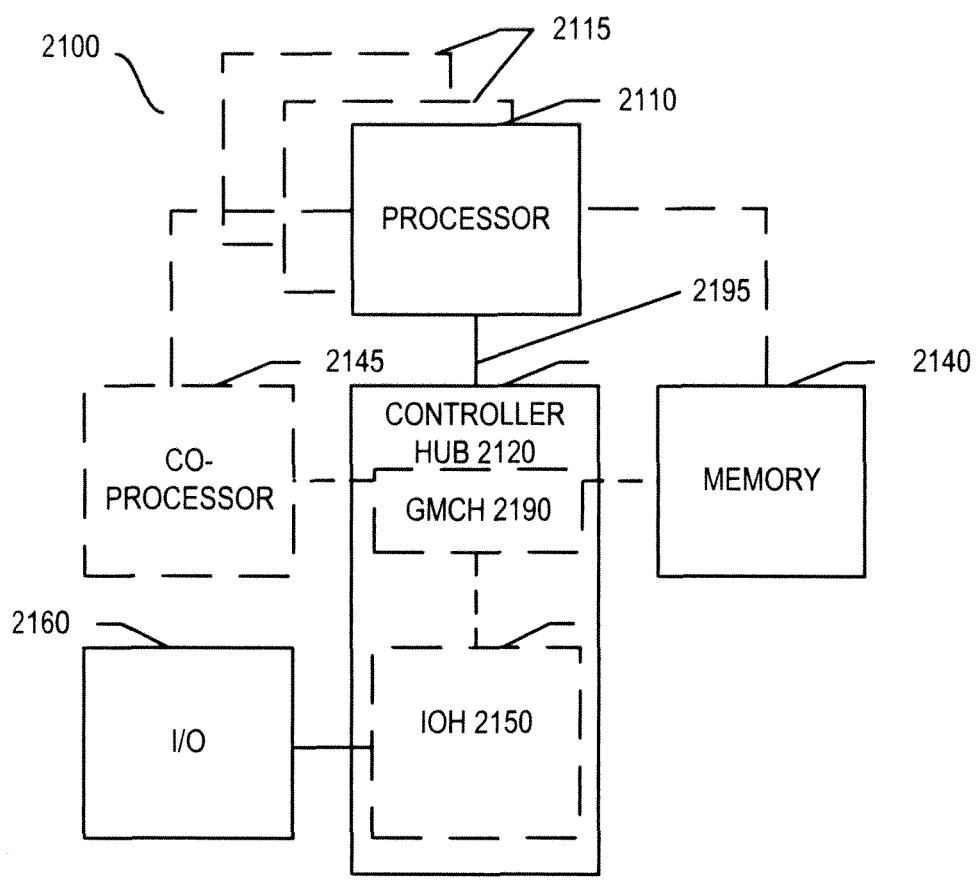
FIG. 21 is a block diagram of a first embodiment of a computer architecture.

Referring now to FIG. 21, shown is a block diagram of a system 2100 in accordance with one embodiment of the present invention. The system 2100 may include one or more processors 2110, 2115, which are coupled to a controller hub 2120. In one embodiment the controller hub 2120 includes a graphics memory controller hub (GMCH) 2190 and an Input/Output Hub (IOH) 2150 (which may be on separate chips); the GMCH 2190 includes memory and graphics controllers to which are coupled memory 2140 and a coprocessor 2145; the IOH 2150 is couples input/output (I/O) devices 2160 to the GMCH 2190. Alternatively, one or both of the memory and graphics controllers are integrated within the processor (as described herein), the memory 2140 and the coprocessor 2145 are coupled directly to the processor 2110, and the controller hub 2120 in a single chip with the IOH 2150.

The optional nature of additional processors 2115 is denoted in FIG. 21 with broken lines. Each processor 2110, 2115 may include one or more of the processing cores described herein and may be some version of the processor 2000.

The memory 2140 may be, for example, dynamic random access memory (DRAM), phase change memory (PCM), or a combination of the two. For at least one embodiment, the controller hub 2120 communicates with the processor(s) 2110, 2115 via a multi-drop bus, such as a frontside bus (FSB), point-to-point interface such as QuickPath Interconnect (QPI), or similar connection 2195.

In one embodiment, the coprocessor 2145 is a special-purpose processor, such as, for example, a high-throughput MIC processor, a network or communication processor, compression engine, graphics processor, GPGPU, embedded processor, or the like. In one embodiment, controller hub 2120 may include an integrated graphics accelerator.

There can be a variety of differences between the physical resources 2110, 2115 in terms of a spectrum of metrics of merit including architectural, microarchitectural, thermal, power consumption characteristics, and the like.

In one embodiment, the processor 2110 executes instructions that control data processing operations of a general type. Embedded within the instructions may be coprocessor instructions. The processor 2110 recognizes these coprocessor instructions as being of a type that should be executed by the attached coprocessor 2145. Accordingly, the processor 2110 issues these coprocessor instructions (or control signals representing coprocessor instructions) on a coprocessor bus or other interconnect, to coprocessor 2145. Coprocessor(s) 2145 accept and execute the received coprocessor instructions.

Figure 22:
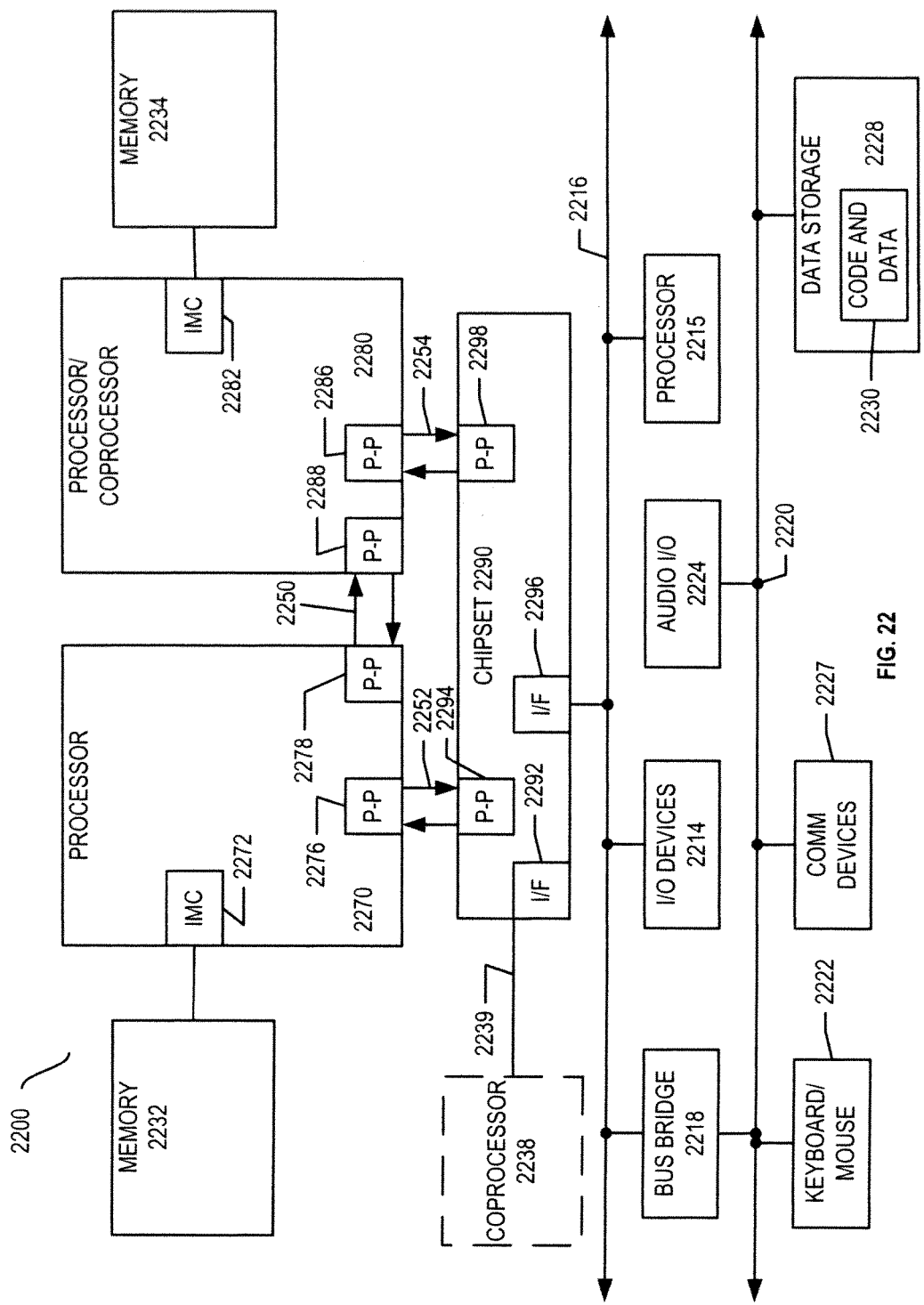
FIG. 22 is a block diagram of a second embodiment of a computer architecture.

Referring now to FIG. 22, shown is a block diagram of a first more specific exemplary system 2200 in accordance with an embodiment of the present invention. As shown in FIG. 22, multiprocessor system 2200 is a point-to-point interconnect system, and includes a first processor 2270 and a second processor 2280 coupled via a point-to-point interconnect 2250. Each of processors 2270 and 2280 may be some version of the processor 2000. In one embodiment of the invention, processors 2270 and 2280 are respectively processors 2110 and 2115, while coprocessor 2238 is coprocessor 2145. In another embodiment, processors 2270 and 2280 are respectively processor 2110 coprocessor 2145.

Processors 2270 and 2280 are shown including integrated memory controller (IMC) units 2272 and 2282, respectively. Processor 2270 also includes as part of its bus controller units point-to-point (P-P) interfaces 2276 and 2278; similarly, second processor 2280 includes P-P interfaces 2286 and 2288. Processors 2270, 2280 may exchange information via a point-to-point (P-P) interface 2250 using P-P interface circuits 2278, 2288. As shown in FIG. 22, IMCs 2272 and 2282 couple the processors to respective memories, namely a memory 2232 and a memory 2234, which may be portions of main memory locally attached to the respective processors.

Processors 2270, 2280 may each exchange information with a chipset 2290 via individual P-P interfaces 2252, 2254 using point to point interface circuits 2276, 2294, 2286, 2298. Chipset 2290 may optionally exchange information with the coprocessor 2238 via a high-performance interface 2239. In one embodiment, the coprocessor 2238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2290 may be coupled to a first bus 2216 via an interface 2296. In one embodiment, first bus 2216 may be a Peripheral Component Interconnect (PCI) bus, or a bus such as a PCI Express bus or another third generation I/O interconnect bus, although the scope of the present invention is not so limited.

As shown in FIG. 22, various I/O devices 2214 may be coupled to first bus 2216, along with a bus bridge 2218 which couples first bus 2216 to a second bus 2220. In one embodiment, one or more additional processor(s) 2215, such as coprocessors, high-throughput MIC processors, GPGPU's, accelerators (such as, e.g., graphics accelerators or digital signal processing (DSP) units), field programmable gate arrays, or any other processor, are coupled to first bus 2216. In one embodiment, second bus 2220 may be a low pin count (LPC) bus. Various devices may be coupled to a second bus 2220 including, for example, a keyboard and/or mouse 2222, communication devices 2227 and a storage unit 2228 such as a disk drive or other mass storage device which may include instructions/code and data 2230, in one embodiment. Further, an audio I/O 2224 may be coupled to the second bus 2220. Note that other architectures are possible. For example, instead of the point-to-point architecture of FIG. 22, a system may implement a multi-drop bus or other such architecture.

Figure 23:
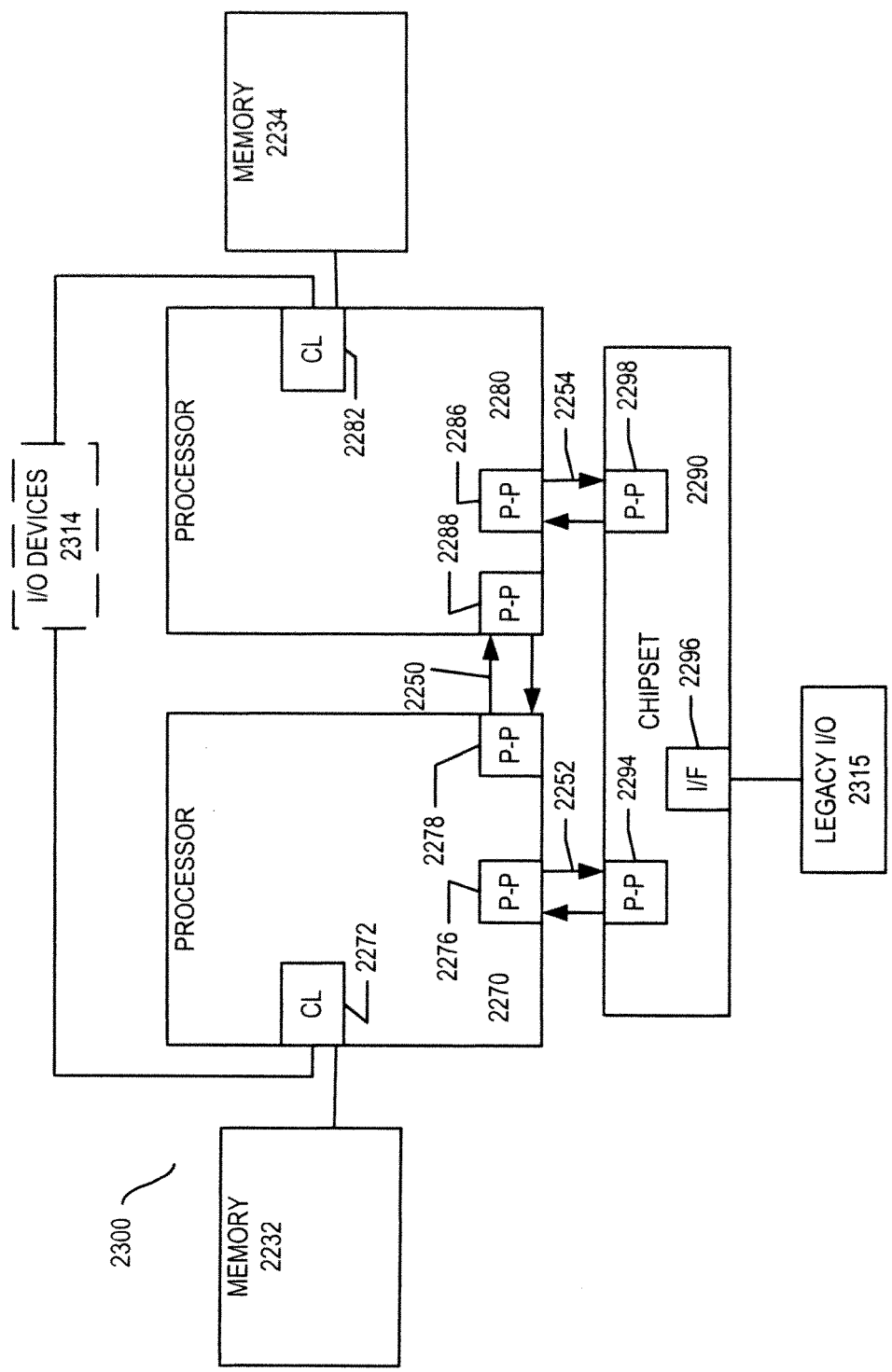
FIG. 23 is a block diagram of a third embodiment of a computer architecture.

Referring now to FIG. 23, shown is a block diagram of a second more specific exemplary system 2300 in accordance with an embodiment of the present invention. Like elements in FIGS. 22 and 23 bear like reference numerals, and certain aspects of FIG. 22 have been omitted from FIG. 23 in order to avoid obscuring other aspects of FIG. 23.

FIG. 23 illustrates that the processors 2270, 2280 may include integrated memory and I/O control logic ("CL") 2272 and 2282, respectively. Thus, the CL 2272, 2282 include integrated memory controller units and include I/O control logic. FIG. 23 illustrates that not only are the memories 2232, 2234 coupled to the CL 2272, 2282, but also that I/O devices 2314 are also coupled to the control logic 2272, 2282. Legacy I/O devices 2315 are coupled to the chipset 2290.

Figure 24:
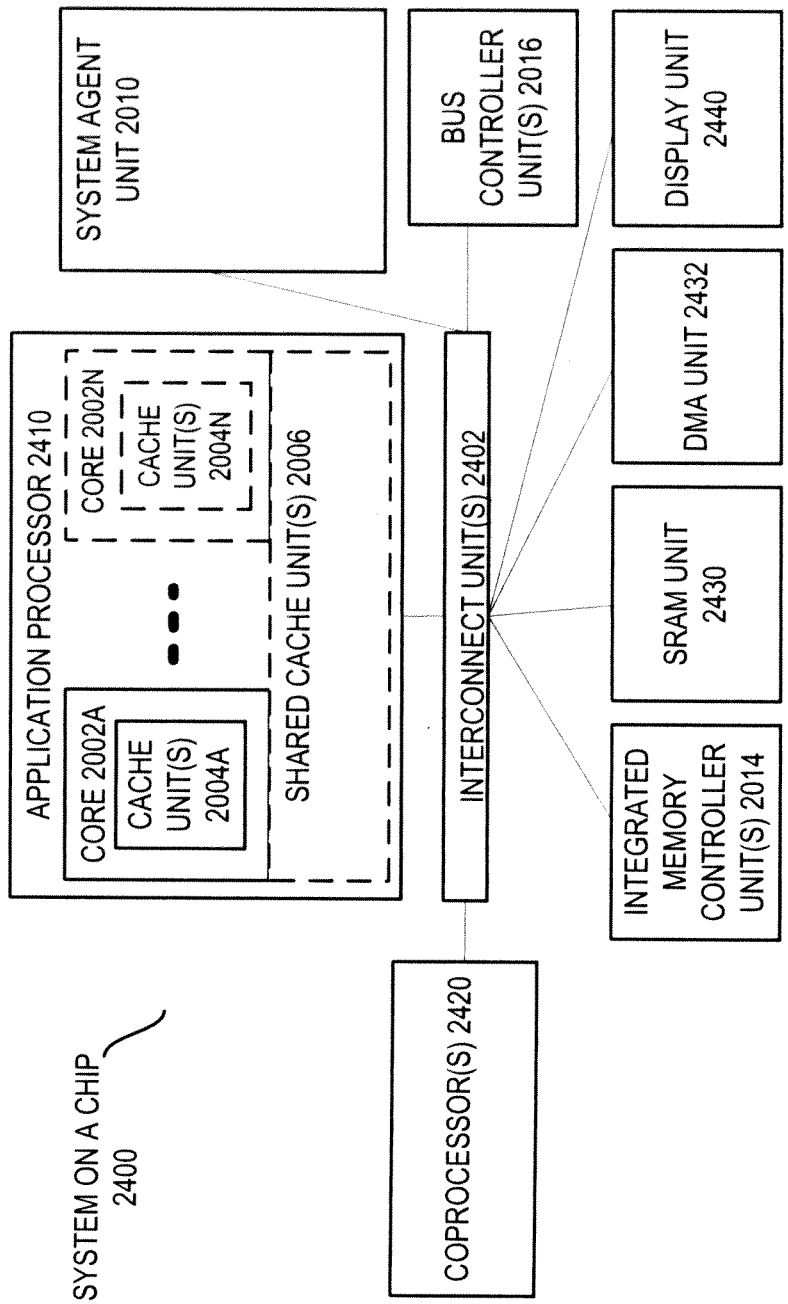
FIG. 24 is a block diagram of a fourth embodiment of a computer architecture.

Referring now to FIG. 24, shown is a block diagram of a SoC 2400 in accordance with an embodiment of the present invention. Similar elements in FIG. 20 bear like reference numerals. Also, dashed lined boxes are optional features on more advanced SoCs. In FIG. 24, an interconnect unit(s) 2402 is coupled to: an application processor 2410 which includes a set of one or more cores 202A-N and shared cache unit(s) 2006; a system agent unit 2010; a bus controller unit(s) 2016; an integrated memory controller unit(s) 2014; a set or one or more coprocessors 2420 which may include integrated graphics logic, an image processor, an audio processor, and a video processor; an static random access memory (SRAM) unit 2430; a direct memory access (DMA) unit 2432; and a display unit 2440 for coupling to one or more external displays. In one embodiment, the coprocessor(s) 2420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2230 illustrated in FIG. 22, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 25 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 25 shows a program in a high level language 2502 may be compiled using an x86 compiler 2504 to generate x86 binary code 2506 that may be natively executed by a processor with at least one x86 instruction set core 2516. The processor with at least one x86 instruction set core 2516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2504 represents a compiler that is operable to generate x86 binary code 2506 (e.g., object code) that can, with or without additional linkage processing, be executed on the processor with at least one x86 instruction set core 2516. Similarly, FIG. 25 shows the program in the high level language 2502 may be compiled using an alternative instruction set compiler 2508 to generate alternative instruction set binary code 2510 that may be natively executed by a processor without at least one x86 instruction set core 2514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2512 is used to convert the x86 binary code 2506 into code that may be natively executed by the processor without an x86 instruction set core 2514. This converted code is not likely to be the same as the alternative instruction set binary code 2510 because an instruction converter capable of this is difficult to make; however, the converted code will accomplish the general operation and be made up of instructions from the alternative instruction set. Thus, the instruction converter 2512 represents software, firmware, hardware, or a combination thereof that, through emulation, simulation or any other process, allows a processor or other electronic device that does not have an x86 instruction set processor or core to execute the x86 binary code 2506.

Components, features, and details described for any of FIGS. 3-4 may also optionally be used in any of FIGS. 1-2. Components, features, and details described for any of FIGS. 6-13 may also optionally be used in any of FIG. 1 or 5. Moreover, components, features, and details described herein for any of the apparatus described herein may also optionally be used in and/or apply to any of the methods described herein, which in embodiments may be performed by and/or with such apparatus. Any of the processors described herein may be included in any of the computer systems or other systems disclosed herein. In some embodiments, the instructions may have features or details of the instruction formats disclosed herein, although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor including a plurality of packed data registers, and a decode unit to decode an instruction. The instruction is to indicate a first source packed data that is to include a first set of at least four data elements, is to indicate a second source packed data that is to include a second set of at least four data elements, and is to indicate a destination storage location. An execution unit is coupled with the packed data registers and the decode unit. The execution unit, in response to the instruction, is to store a result packed data in the destination storage location. The result packed data is to include at least four indexes. The indexes are to identify corresponding data element positions in the first and second source packed data. The indexes are to be stored in positions in the result packed data that are to represent a sorted order of corresponding data elements in the first and second source packed data.

Example 2 includes the processor of Example 1, in which the execution unit is to store the result packed data in which each of the indexes is to identify a corresponding data element position in each of the first and second source packed data. Also, in which the execution unit, in response to the instruction, is to store a result mask that is to have at least four mask elements, in which each mask element is to correspond to a different one of the indexes. Also, in which each mask element is to indicate whether the data element position for the corresponding index is in the first source packed data or the second source packed data.

Example 3 includes the processor of Example 2, further including a mask register to store the result mask. The instruction is included in an instruction set that includes a second instruction that is able to indicate the result mask as a predicate operand to predicate a packed data operation.

Example 4 includes the processor of Example 1, in which the execution unit is to store the result packed data in which each of the indexes is to identify the corresponding single data element in one of the first and second source packed data.

Example 5 includes the processor of any of Examples 1 to 4, in which the execution unit, in response to the instruction, is to store a second result packed data in a second destination storage location that is to be indicated by the instruction. The second result packed data is to include the data elements from the first and second source packed data that correspond to the indexes stored in positions of the second result packed data that reflect the sorted order.

Example 6 includes the processor of any of Examples 1 to 4, in which the decode unit is to decode the instruction that is to indicate the first source packed data having the at least four data elements that are assumed to be in sorted order for the instruction, and that is to indicate the second source packed data having the at least four data elements that are assumed to be in sorted order for the instruction.

Example 7 includes the processor of any of Examples 1 to 4, in which the decode unit is to decode the instruction that is to indicate the first source packed data having the at least four data elements that are not assumed to be in sorted order for the instruction, and that is to indicate the second source packed data having the at least four data elements that are not assumed to be in sorted order for the instruction.

Example 8 includes the processor of any of Examples 1 to 4, in which the execution unit is to store the result packed data in which the indexes are to be stored in the positions that are to represent the sorted order of the corresponding data elements that are to include a smallest half of all of the data elements of the first and second source packed data.

Example 9 includes the processor of any of Examples 1 to 4, in which the execution unit is to store the result packed data in which the indexes are to be stored in the positions that are to represent the sorted order of the corresponding data elements that are to include a largest half of all of the data elements of the first and second source packed data.

Example 10 includes the processor of any of Examples 1 to 4, in which the decode unit is to decode the instruction that is to indicate the first source packed data that is to include at least eight data elements which are each to have one of 32-bits and 64-bits.

Example 11 is a method in a processor that includes receiving an instruction. The instruction indicating a first source packed data including a first set of at least four data elements, indicating a second source packed data including a second set of at least four data elements, and indicating a destination storage location. Storing result packed data in the destination storage location in response to the instruction. The result packed data including at least four indexes. The indexes identifying corresponding data element positions in the first and second source packed data. The indexes stored in positions in the result packed data that represent a sorted order of corresponding data elements in the first and second source packed data.

Example 12 includes the method of Example 11, in which receiving includes receiving the instruction indicating the first source packed data having the at least four data elements in sorted order.

Example 13 includes the method of any one of Examples 11 to 12, in which storing the result packed data includes storing result packed data in which each of the indexes identifies the corresponding single data element in one of the first and second source packed data.

Example 14 is processor including a plurality of packed data registers, and a decode unit to decode an instruction. The instruction to indicate a source packed data that is to include at least four data elements that are not in a sorted order, and to indicate a destination storage location. An execution unit is coupled with the packed data registers and the decode unit. The execution unit, in response to the instruction, is to store a result packed data in the destination storage location. The result packed data to include at least four indexes. The indexes to identify corresponding data elements in the source packed data. The indexes to be stored in positions in the result packed data that are to represent the sorted order of the corresponding data elements in the source packed data.

Example 15 includes the processor of Example 14, in which the execution unit, in response to the instruction, is to store a second result packed data in a second destination storage location that is to be indicated by the instruction, the second result packed data to include the corresponding data elements stored in positions of the second result packed data that reflect the sorted order.

Example 16 includes the processor of any of Examples 14 to 15, in which the result packed data is to include indexes corresponding to all data elements in the source packed data.

Example 17 includes the processor of any of Examples 14 to 15, in which the decode unit is to decode the instruction that is to indicate the source packed data that is to include at least eight data elements that are each to have one of 32-bits and 64-bits.

Example 18 is a method in a processor including receiving an instruction, the instruction indicating a source packed data including at least four data elements that are not in a sorted order, and indicating a destination storage location. Storing result packed data in the destination storage location in response to the instruction. The result packed data including at least four indexes. The indexes identifying corresponding data elements in the source packed data. The indexes stored in positions in the result packed data that represent the sorted order of the corresponding data elements in the source packed data.

Example 19 includes the method of Example 18, further including storing a second result packed data in a second destination storage location indicated by the instruction, the second result packed data including the corresponding data elements stored in positions that reflect the sorted order.

Example 20 includes the method of any one of Examples 18 to 19, in which receiving includes receiving the instruction indicating the source packed data having at least eight data elements that each have one of 32-bits and 64-bits, and in which storing includes storing the result packed data including indexes corresponding to all data elements in the source packed data.

Example 21 is a system to process instructions including an interconnect, and a processor coupled with the interconnect. The processor to receive an instruction, the instruction to indicate a first source packed data that is to include a first set of at least four data elements, to indicate a second source packed data that is to include a second set of at least four data elements, and to indicate a destination register. The processor, in response to the instruction, to store a result packed data in the destination register. The result packed data to include at least four indexes. The indexes to identify corresponding data element positions in the first and second source packed data. The indexes to be stored in positions in the result packed data that are to represent a sorted order of corresponding data elements in the first and second source packed data. A dynamic random access memory (DRAM) is coupled with the interconnect. The DRAM optionally stores an algorithm to use the indexes of the result packed data to sort data.

Example 22 includes the system of 21, in which the processor is to store the result packed data in which each of the indexes is to identify the corresponding single data element in one of the first and second source packed data.

Example 23 is an article of manufacture including a non-transitory machine-readable storage medium, the non-transitory machine-readable storage medium storing an instruction. The instruction to indicate a first source packed data that is to include a first set of at least four data elements, to indicate a second source packed data that is to include a second set of at least four data elements, and that is to indicate a destination storage location. The instruction if executed by a machine is to cause the machine to perform operations including storing result packed data in the destination storage location in response to the instruction. The result packed data including at least four indexes. The indexes identifying corresponding data element positions in the first and second source packed data. The indexes stored in positions in the result packed data that represent a sorted order of corresponding data elements in the first and second source packed data.

Example 24 includes the article of manufacture of 23, in which the instruction indicates the first source packed data having the at least four data elements in sorted order.

Example 25 is a processor or other apparatus including means for performing the method of any of 11-13.

Example 26 is a processor or other apparatus including modules, units, logic, circuitry, means, or any combination thereof, to perform the method of any of 11-13.

Example 27 is an article of manufacture including a machine-readable medium, which is optionally a non-transitory machine-readable storage medium, that provides an instruction that if and/or when executed by a processor, computer system, or other machine is operable to cause the machine to perform the method of any of 11-13.

Example 28 is a computer system or other electronic device including an interconnect; a processor coupled with the interconnect; and at least one component coupled with the interconnect that is selected from a dynamic random access memory (DRAM), a graphics chip, a wireless communications chip, a phase change memory, and a video camera, the computer system or other electronic device operable to perform the method of any of 11-13.

Example 29 is a processor or other apparatus including means for performing the method of any of 18-20.

Example 30 is a processor or other apparatus including modules, units, logic, circuitry, means, or any combination thereof, to perform the method of any of 18-20.

Example 31 is an article of manufacture including a machine-readable medium, which is optionally a non-transitory machine-readable storage medium, that provides an instruction that if and/or when executed by a processor, computer system, or other machine is operable to cause the machine to perform the method of any of 18-20.

Example 32 is a computer system or other electronic device including an interconnect; a processor coupled with the interconnect; and at least one component coupled with the interconnect that is selected from a dynamic random access memory (DRAM), a graphics chip, a wireless communications chip, a phase change memory, and a video camera, the computer system or other electronic device operable to perform the method of any of 18-20.

Example 33 is a processor or other apparatus that is operable to perform one or more operations or any method substantially as described herein.

Example 34 is a processor or other apparatus including means for performing one or more operations or any method substantially as described herein.

Example 35 is a processor or other apparatus to perform any of the instructions substantially as described herein.

Example 36 is a processor or other apparatus including means for performing any of the instructions substantially as described herein.

Example 37 includes a method that includes converting a first instruction, which may be any of the instructions substantially as disclosed herein, and which is of a first instruction set, into one or more instructions of a second instruction set. The method also includes decoding and executing the one or more instructions of the second instruction set on a processor. The executing includes storing a result in a destination. The result may include any of the results substantially as disclosed herein for the first instruction.

Example 38 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 39 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

What is claimed is:

1. A processor comprising:
   a plurality of packed data registers;
   a decode unit to decode an instruction, the instruction to indicate a first source packed data that is to include a first set of at least four data elements, to indicate a second source packed data that is to include a second set of at least four data elements, and to indicate a destination storage location; and
   an execution unit coupled with the packed data registers and the decode unit, the execution unit, in response to the instruction, to store a result packed data in the destination storage location, and to store a result mask that is to have at least four mask elements,
   the result packed data to include at least four indexes,
   each of the indexes to identify a corresponding data element position in each of the first and second source packed data, wherein each mask element is to correspond to a different one of the indexes, and wherein each mask element is to indicate whether the corresponding data element position for the corresponding index is in the first source packed data or the second source packed data, and
   the indexes to be stored in positions in the result packed data that are to represent a sorted order of corresponding data elements in the first and second source packed data.

2. The processor of claim 1, further comprising a mask register to store the result mask, and wherein the instruction is included in an instruction set that includes a second instruction that is able to indicate the result mask as a predicate operand to predicate a packed data operation.

3. The processor of claim 1, wherein the execution unit, in response to the instruction, is to store a second result packed data in a second destination storage location that is to be indicated by the instruction, the second result packed data to include the corresponding data elements from the first and second source packed data that correspond to the indexes and their corresponding mask elements, the corresponding data elements to be stored in positions of the second result packed data that reflect the sorted order.

4. The processor of claim 1, wherein the first set of at least four data elements are implicitly assumed to be in sorted order for the instruction in order for the instruction to operate correctly, and the second set of at least four data elements are implicitly assumed to be in sorted order for the instruction in order for the instruction to operate correctly.

5. The processor of claim 1, wherein the first set of at least four data elements are not assumed to be in sorted order for the instruction, and the second set of at least four data elements are not assumed to be in sorted order for the instruction.

6. The processor of claim 1, wherein the execution unit is to store the result packed data in which the indexes are to be stored in the positions that are to represent the sorted order of the corresponding data elements that are to include only a smallest half of all of the data elements of the first and second source packed data.

7. The processor of claim 1, wherein the execution unit is to store the result packed data in which the indexes are to be stored in the positions that are to represent the sorted order of the corresponding data elements that are to include only a largest half of all of the data elements of the first and second source packed data.

8. The processor of claim 1, wherein the decode unit is to decode the instruction that is to indicate the first source packed data that is to include at least eight data elements which are each to have one of 32-bits and 64-bits.

9. A method in a processor comprising:
   receiving an instruction, the instruction indicating a first source packed data including a first set of at least four data elements, indicating a second source packed data including a second set of at least four data elements, and indicating a destination storage location;
   storing a result mask in a storage location of the processor in response to the instruction, the result mask having at least four mask elements; and
   storing result packed data in the destination storage location in response to the instruction, the result packed data including at least four indexes,
   each of the indexes identifying a corresponding data element position in each of the first and second source packed data, wherein each mask element corresponds to a different one of the indexes, and wherein each mask element indicates whether the corresponding data element position for the corresponding index is in the first source packed data or the second source packed data, and
   the indexes stored in positions in the result packed data that represent a sorted order of corresponding data elements in the first and second source packed data.

10. The method of claim 9, wherein said receiving comprises receiving the instruction indicating the first source packed data having the first set of at least four data elements in sorted order, and wherein the first set of at least four data elements must be in the sorted order in order for the instruction to operate correctly.

11. A system to process instructions, the system comprising:
    an interconnect;
    a processor coupled with the interconnect, the processor to receive a first instruction, the first instruction to indicate a first source packed data that is to include a first set of at least four data elements, to indicate a second source packed data that is to include a second set of at least four data elements, and to indicate a destination register, the processor, in response to the first instruction, to store a result packed data in the destination register, and to store a result mask that is to have at least four mask elements,
    the result packed data to include at least four indexes,
    each of the indexes to identify a corresponding data element position in each of the first and second source packed data, wherein each mask element is to correspond to a different one of the indexes, and wherein each mask element is to indicate whether the corresponding data element position for the corresponding index is in the first source packed data or the second source packed data, and
    the indexes to be stored in positions in the result packed data that are to represent a sorted order of corresponding data elements in the first and second source packed data; and
    a dynamic random access memory (DRAM) coupled with the interconnect, the DRAM storing an algorithm to use the indexes of the result packed data to sort data.

12. A processor comprising:
    a plurality of packed data registers;

a decode unit to decode an instruction, the instruction to indicate a first source packed data that is to include a first set of at least four data elements, to indicate a second source packed data that is to include a second set of at least four data elements, and to indicate a destination storage location; and an execution unit coupled with the packed data registers and the decode unit, the execution unit, in response to the instruction, to store a result packed data in the destination storage location, the result packed data to include at least four indexes, the indexes to identify corresponding data element positions in the first and second source packed data, and the indexes to be stored in positions in the result packed data that are to represent a sorted order of corresponding data elements in the first and second source packed data, and wherein it is to be implicit to the instruction that the first set of at least four data elements are to be sorted when in the first source packed data, and that the second set of at least four data elements are to be sorted when in the second source packed data, for the result packed data to be correct, wherein the execution unit is to store the result packed data in which each of the indexes is to identify a corresponding data element position in each of the first and second source packed data, and wherein the execution unit, in response to the instruction, is to store a result mask that is to have at least four mask elements, in which each mask element is to correspond to a different one of the indexes, and in which each mask element is to indicate whether the data element position for the corresponding index is in the first source packed data or the second source packed data.

* * * * *